US012502041B2

(12) United States Patent
Woon et al.

(10) Patent No.: US 12,502,041 B2
(45) Date of Patent: Dec. 23, 2025

(54) BATHROOM MODULAR DEVICE, BATHROOM MANAGING SYSTEM, AND BATHROOM MANAGING METHOD

(71) Applicant: Kohler Co., Kohler, WI (US)

(72) Inventors: Taiwoon Woon, Singapore (SG); Andrew James Stokes, Mazomanie, WI (US)

(73) Assignee: Kohler Co., Kohler, WI (US)

( * ) Notice: Subject to any disclaimer, the term of this patent is extended or adjusted under 35 U.S.C. 154(b) by 412 days.

(21) Appl. No.: 18/082,056

(22) Filed: Dec. 15, 2022

(65) Prior Publication Data

US 2023/0200598 A1 Jun. 29, 2023

Related U.S. Application Data

(60) Provisional application No. 63/293,250, filed on Dec. 23, 2021.

(51) Int. Cl.
*A47K 10/32* (2006.01)
*B65F 1/14* (2006.01)

(52) U.S. Cl.
CPC ................ *A47K 10/32* (2013.01); *B65F 1/14* (2013.01); *A47K 2201/02* (2013.01); *B65F 2210/168* (2013.01)

(58) Field of Classification Search
CPC ................ A47K 10/32; A47K 2201/02; A47K 2010/324; A47K 10/38; A47K 10/3809;
(Continued)

(56) References Cited

U.S. PATENT DOCUMENTS

2002/0108507 A1* 8/2002 May ...................... B65F 1/1638 700/229
2007/0023565 A1* 2/2007 Babikian ................ A47K 10/38 242/598.6

(Continued)

FOREIGN PATENT DOCUMENTS

GB 2589808 A 6/2021

OTHER PUBLICATIONS

Extended European Search Report from European Patent Application No. 22215841.2, dated Aug. 30, 2023, 12 pages.

(Continued)

*Primary Examiner* — Donnell A Long
(74) *Attorney, Agent, or Firm* — Lempia Summerfield Katz LLC

(57) ABSTRACT

A bathroom modular device includes a base, including a lower surface, configured to be connected to a bathroom fixture and includes a module assembly having a plurality of modules, at least one module configured to be removably connected to the lower surface of the base. A managing system includes a bathroom modular device and a server communicably connected to the modular device. The bathroom modular device includes a base configured to be connected to a bathroom fixture and comprising a lower surface. The bathroom modular device also includes a module assembly comprising a plurality of modules, at least one module configured to be removably connected to a lower surface of the base. A bathroom managing method includes receiving a detection result obtained by a sensor; determining whether the received detection result satisfies at least one condition defined by a predetermined value; and generating a notification to perform corresponding maintenance work.

16 Claims, 13 Drawing Sheets

(58) Field of Classification Search
CPC .................. A47K 10/426; A47K 10/46; A47K 2010/3226; A47K 2010/3253; A47K 2010/326; A47K 2010/3266; A47K 2010/3863; A47K 5/1217; A47K 2010/3233; A47K 5/18; B65F 1/14; B65F 2210/168; G06Q 10/087
See application file for complete search history.

(56) References Cited

U.S. PATENT DOCUMENTS

| | | | | |
|---|---|---|---|---|
| 2007/0257058 | A1 | 11/2007 | Ophardt et al. | |
| 2015/0238056 | A1* | 8/2015 | Fellhoelter | A47K 10/3687 242/560 |
| 2018/0263435 | A1* | 9/2018 | Osborne, Jr. | B65H 26/06 |
| 2018/0368627 | A1 | 12/2018 | Ghazi et al. | |
| 2019/0063980 | A1* | 2/2019 | Kobs | G01F 11/003 |
| 2019/0290078 | A1* | 9/2019 | Moses | A47K 10/38 |
| 2020/0205620 | A1* | 7/2020 | Osborne, Jr. | A47K 10/3625 |
| 2021/0030216 | A1* | 2/2021 | Ophardt | A47K 5/1207 |
| 2021/0052115 | A1* | 2/2021 | Casper | B65D 83/48 |

OTHER PUBLICATIONS

Extended European Search Report from European Patent Application No. 22215841.2, dated May 30, 2023, 12 pages.

* cited by examiner

BATHROOM MODULAR DEVICE, BATHROOM MANAGING SYSTEM, AND BATHROOM MANAGING METHOD

CROSS REFERENCE TO PRIOR APPLICATION

This application claims priority benefit of Provisional Application No. 63/293,250 filed Dec. 23, 2021, the content of which is hereby incorporated by reference in its entirety.

FIELD

The present disclosure relates to a bathroom modular device, a bathroom managing system, and a bathroom managing method. In particular, the present disclosure relates to a bathroom modular device comprising different functional modules selected by users, a system thereof, and a method thereof.

BACKGROUND

Toilet cubicles in the public bathrooms are partitioned spaces for users to use the toilets while keeping the privacy for each user. The toilet cubicles provide dispensers configured to supply toilet paper and menstrual products and provide trash bins configured to receive the used toilet paper and the used menstrual products. When the dispensers and the trash bins are disposed on the different locations (e.g., two corners of the toilet cubicles) of the toilet cubicles, the users have to turn their bodies toward different directions to reach the dispensers and the trash bins while sitting on the toilet seat. Therefore, the users, especially the female users, struggle with the lack of dedicated space when moving their bodies in the toilet cubicles.

Thus, there is a need to provide a more thoughtful and compact bathroom device to reduce or eliminate the difficulties that the users have to turn their bodies to reach the dispensers and the trash bins while sitting on the toilet seat.

Additionally, due to the large number of users, the cleaners have to check the dispensers periodically to refill them with clean toilet paper and clean menstrual products and check the trash bins periodically to remove the trash including the used toilet paper and menstrual products. Therefore, when the cleaners fail to check the dispensers before the clean toilet paper and menstrual products are used up, the users cannot ask the managing person or the cleaners of the public bathrooms for help without leaving the toilet cubicles. Thus, the users are panicked by such a situation. Also, when the cleaners fail to check the trash bins before the used toilet paper or menstrual products fill up all internal spaces of the trash bins, the users have to leave the used toilet paper or menstrual products outside the trash bins. Therefore, the dirty paper and products may not only reduce the cleanness in the toilet cubicles but also spread viruses or bacteria and thus cause health risks for the users.

Thus, there is a need to provide a more intelligent and user-friendly bathroom device to monitor the supplies and the trash in the bathroom and help the users, without leaving the toilet cubicles, to send a refilling request and a cleaning request to the managing person or the cleaners.

Furthermore, once traditional dispensers and traditional trash bins are installed on the walls, the managing person, the cleaners, or the users of the public bathrooms cannot select a particular combination of the dispensers and the trash bins according to the needs of the users. For example, during a pandemic period, pathogens contained in the excrement particles spread via an airborne transmission and settle on surfaces, e.g., the toilet seat, the toilet lid etc. The pathogens may also be carried by the used toilet paper or the used menstrual products. The users may touch by hand, the toilet seats, the toilet lids, the trash bin lids, the used toilet paper, and the used menstrual products contaminated by the pathogens. The users may also transmit the pathogens to other users by touching, e.g., the door handles of the toilet cubicles. The female users also feel that it is necessary to clean their hands immediately before or after change menstruation products. Therefore, the users need to clean their hands with hand sanitizers in the toilet cubicles before they leave the toilet cubicles. However, traditional hand sanitizer dispensers have to be installed separately on the walls of the toilet cubicles. Also, the walls may be damaged when the hand sanitizer dispensers are removed from the walls.

Thus, there is a need to provide a more versatile bathroom device, which may be customized or retrofitted, without causing damages to the walls of the toilet cubicles, to meet the different needs of the users.

SUMMARY

In one aspect, the present disclosure provides a bathroom modular device, comprising a base configured to be connected to a bathroom fixture and comprising a lower surface and a module assembly comprising a plurality of modules, at least one module of the plurality of modules configured to be removably connected to the lower surface of the base and configured to house at least one consumable product.

In another aspect, the present disclosure provides a managing system, comprising a modular device. The modular device comprises a base configured to be connected to a bathroom fixture and comprising a lower surface and a module assembly comprising a plurality of modules, at least one module of the plurality of modules configured to be removably connected to the lower surface of the base and configured to house at least one consumable product. The managing system further comprises a server communicably connected to the bathroom modular device and configured to receive a notification transmitted by the bathroom modular device.

In another aspect, the present disclosure provides a bathroom managing method, comprising: receiving, by a processor of a bathroom modular device, a detection result obtained by a sensor of the modular device, the bathroom modular device configured to be installed in a bathroom fixture; determining, by the processor of the bathroom modular device, whether the received detection result satisfies at least one condition defined by a predetermined value; and generating, by the processor of the bathroom modular device, a notification for a maintenance person to perform corresponding maintenance work when the processor of the bathroom modular device determines that the received detection result satisfies the at least one condition defined by the predetermined value.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1A:
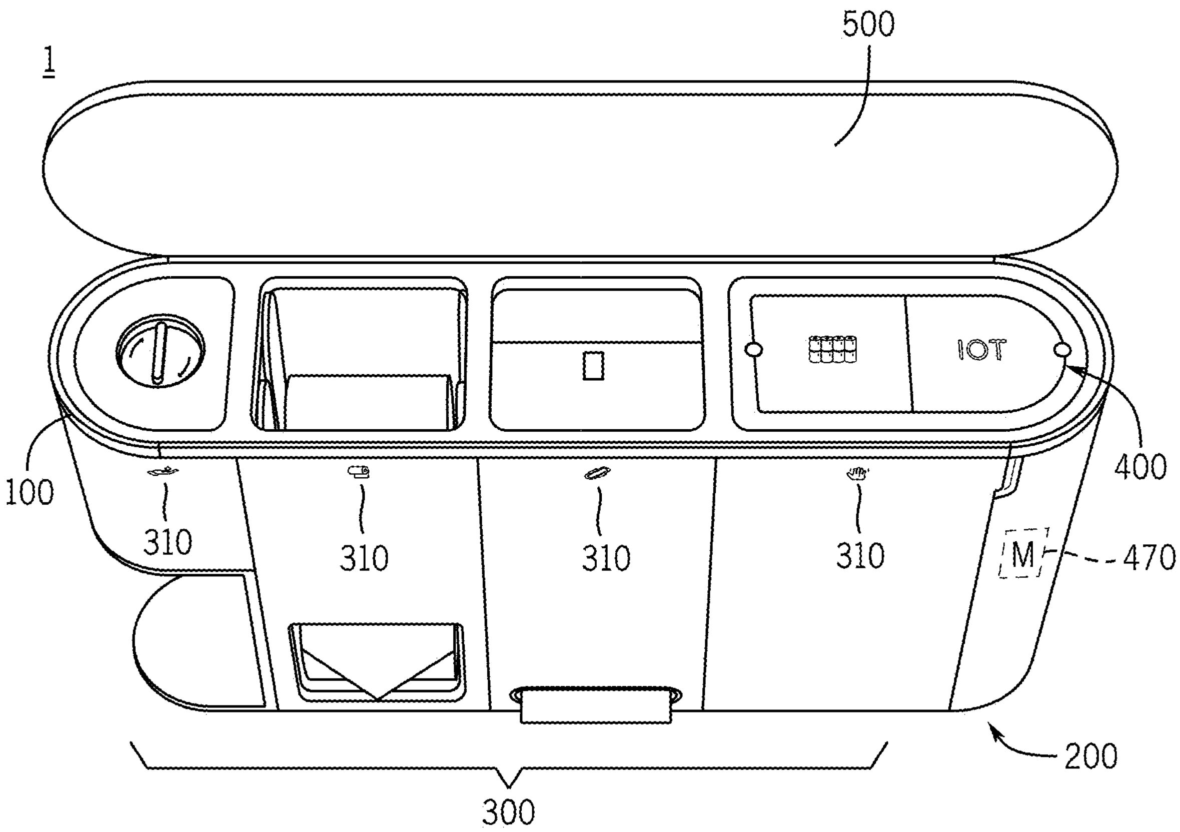
FIG. 1A illustrates a bathroom modular device when a module assembly is filled with toilet paper products and menstrual products according to an embodiment of the present disclosure.

Hereinafter, specific embodiments of the present disclosure are described in detail with reference to the drawings. In adding the reference numerals to the elements of each drawing, it should be noted that the identical or equivalent element is designated by the identical numeral even when they are displayed on other drawings. Further, in describing the embodiments of the present disclosure, a detailed description of well-known features or functions has been omitted in order not to unnecessarily obscure the gist of the present disclosure.

Unless otherwise defined, all terms used herein, including technical and scientific terms, have the same meaning as those generally understood by those having ordinary skill in the art to which the present disclosure pertains. Such terms as those defined in a generally used dictionary should be interpreted as having meanings equal to the contextual meanings in the relevant field of art and should not be interpreted as having ideal or excessively formal meanings unless clearly defined as having such in the present application.

1. Bathroom Modular Device

Figure 1B:
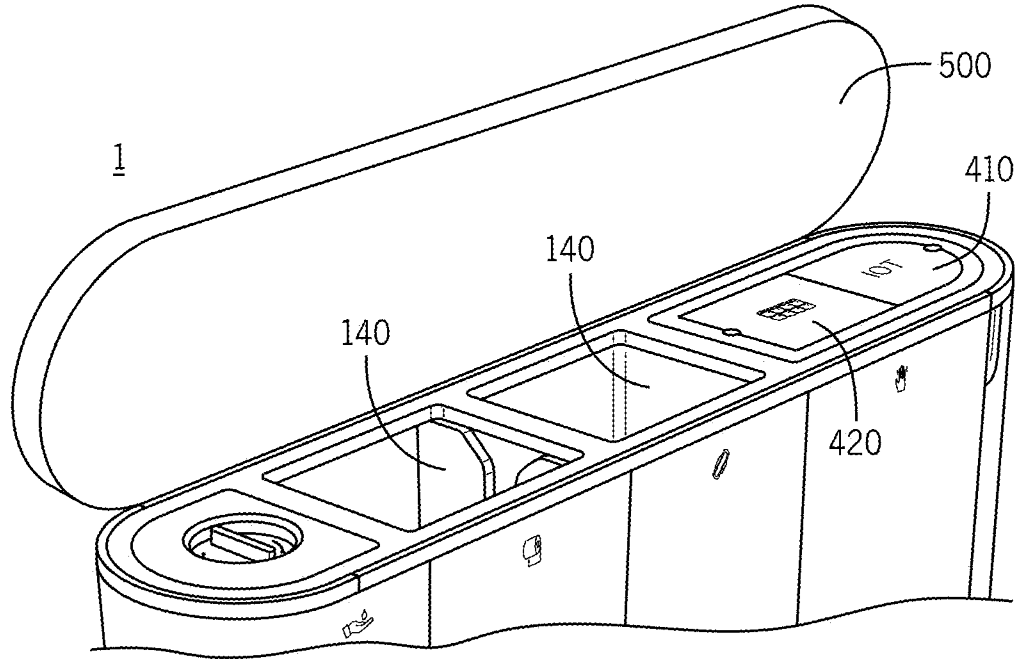
FIG. 1B illustrates a bathroom modular device when the module assembly is empty.
Figure 2A:
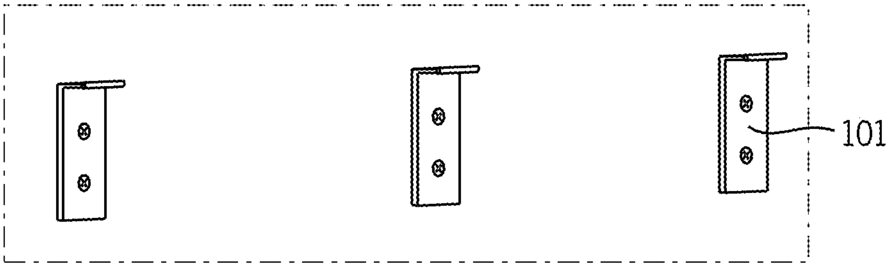
FIG. 2A illustrates fasteners installed on a wall of a bathroom.
Figure 2B:
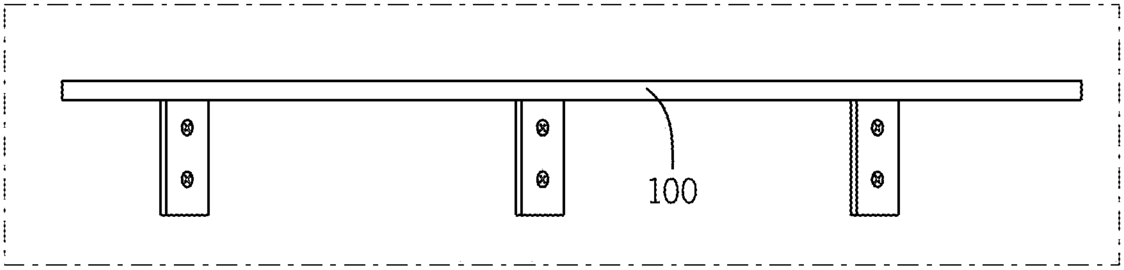
FIG. 2B illustrates a base of the bathroom modular device connected to the wall of the bathroom via the fasteners.
Figure 2C:
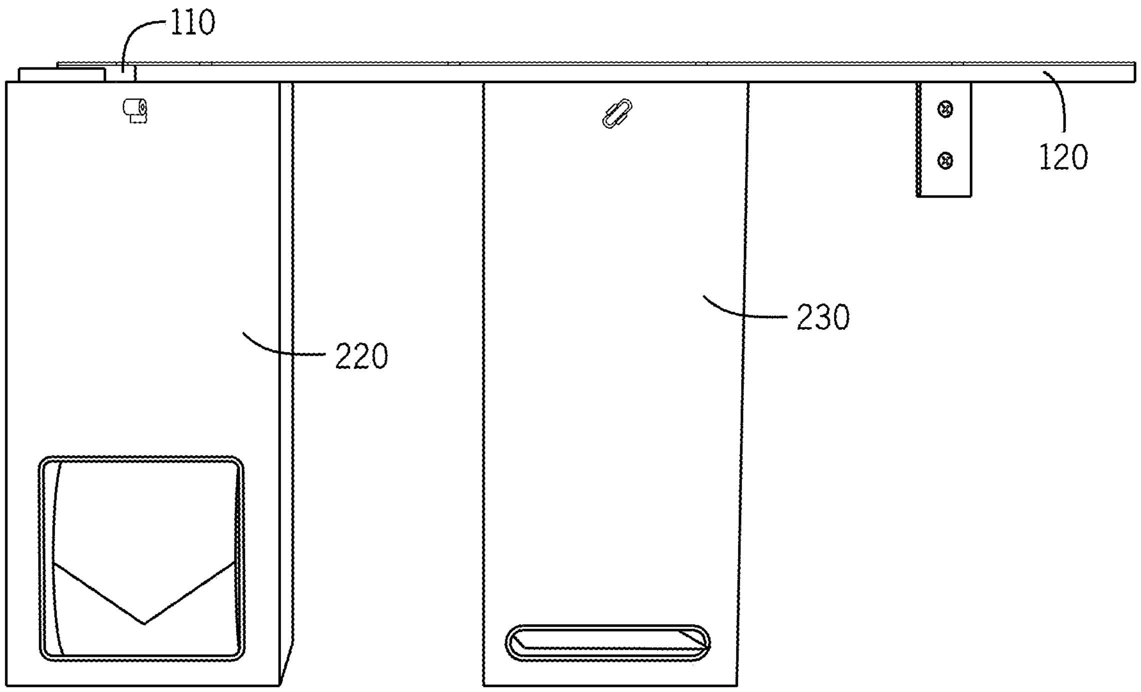
FIG. 2C illustrates each module of the module assembly individually connected to the base.
Figure 2D:
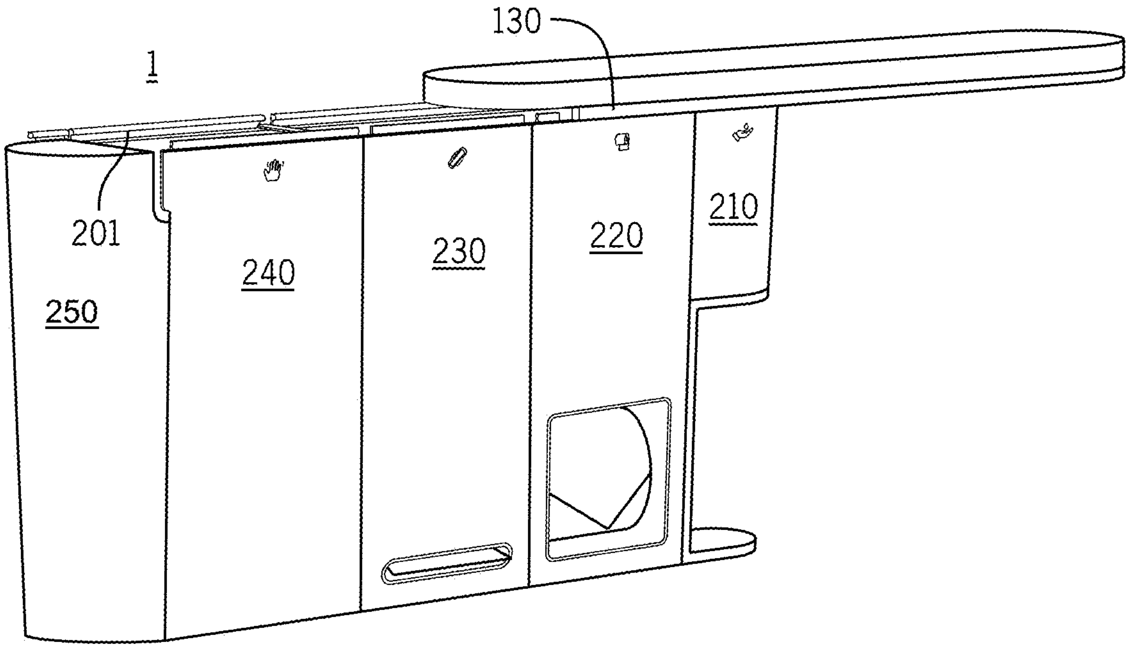
FIG. 2D illustrates the modules connected to each other and connected to the base.

FIG. 1A illustrates a bathroom modular device when a module assembly is filled with toilet products and menstrual products according to the present disclosure. FIG. 1B illustrates a bathroom modular device when the module assembly is empty according to the present disclosure. FIG. 2A illustrates fasteners installed on a wall of a bathroom. FIG. 2B illustrates a base of the bathroom modular device connected to the wall of the bathroom via the fasteners. FIG. 2C illustrates each module of the module assembly individually connected to the base. FIG. 2D illustrates the modules connected to each other and connected to the base.

Referring to FIGS. 1A, 1B, and 2A-2D, a bathroom modular device 1 according to the present disclosure comprises a base 100, a module assembly 200 comprising at least one module removably connected to the base 100, an object sensor assembly 300 disposed on the module assembly 200, a controlling assembly 400 disposed on the base 100, and a lid 500 pivotably connected to base 100.

In an embodiment, the bathroom modular device 1 may be installed on either side wall near the toilet.

In an embodiment, the base 100 of the bathroom modular device 1 is configured to be connected to a wall of each toilet cubicle of a bathroom. In another embodiment, the base 100 may be connected to any other suitable portions of the bathroom. In another embodiment, the base 100 may be connected to other rooms or spaces, where the users may need consumable products. The consumable products may include paper product (e.g., toilet paper, wet wipes, tissues, napkins, or maxi roll towels), sanitizers, menstrual products, or other cleaning/sanitary products. The base 100 may be connected to the wall permanently or non-permanently. In this embodiment, the base 100 may be connected to the wall via a plurality of fasteners 101. In another embodiment, the base 100 may be connected to the wall or other fixtures via adhesive, welding, or other mounting means.

Therefore, the bathroom modular device 1 according to the present disclosure may be easily installed on the wall. In addition, the bathroom modular device 1 may reduce damage to the wall even when a different combination of the modules of the module assembly 200 is selected by the managing person and the cleaners (hereinafter "maintenance person"). The selection may be also made by the users. This is because only the base 100 needs to be installed on the wall or the furniture and the module assembly 200 is connected to base 100 instead of the wall or the furniture.

The base 100 comprises a first end 110, a second end 120, at least one recess 130 on a lower surface of the base 100 disposed between the first end 110 and the second end 120, and a plurality of openings 140 configured to be in communication with an internal space of each module of the module assembly 200. The at least one recess 130 extends along a length axis of the base 100 and configured to receive the module assembly 200 when the module assembly 200 is connected to the base 100. In another embodiment, the base 100 comprises two parallel recesses 130 disposed on two rims of the base 100 between the first end 110 and the second end 120 of the base 100. The two rims extend along the length axis of the base 100.

In an embodiment, each module of the module assembly 200 of the bathroom modular device 1 may comprise at least one rail 201 disposed on an upper surface of each module of the module assembly 200 and disposed at a position corresponding to the at least one recess 130. Thus, the at least one rail 201 may be engaged with and received in the recess 130. When the base 100 comprises two parallel recesses 130, each module of the module assembly 200 may comprise two parallel rails 201 corresponding to the two parallel recesses 130.

To connect the module assembly 200 to the base 100, the plurality of fasteners 101 may be first installed on the wall (see FIG. 2A). Then, the base 100 may be connected to the plurality of fasteners 101 (see FIG. 2B). Then, the maintenance person may slide the module assembly 200 into the base 100 by pushing the module assembly 200 along the at least one recess 130 from the first end 110 of the base 100. The module assembly 200 may be stopped by the second end 120 of the base 100 so that the internal spaces of the module assembly 200 may be aligned with and in communication with the plurality of openings 140 of the base 100. In this embodiment, each module of the module assembly 200 may be individually connected to the base 100 (see FIG. 2C).

In another embodiment, as described in the present disclosure, each module of the module assembly 200 may be accessed either from a front side (the side facing the user or the maintenance person) or from both end sides (left and right sides of the user or the maintenance person), the connection between the base 100 and the module assembly 200 does not need to include the recess 130 and the rail 201. Instead, the base 100 may be a fixed shelf installed on the wall and made of a stainless steel bracket and may include a plurality of snap latch attachments. Each module of the module assembly 200 may include a plurality of holes corresponding to the plurality of snap latch attachments so that the module assembly 200 can be hooked or snapped onto the base 100.

Therefore, the structure may be further simplified and the manufacturing costs may be further reduced.

In another embodiment, the modules of the module assembly 200 may be not only connected to the base 100 but also connected to each other (see FIG. 2D). Therefore, the module assembly 200 may be more stably and securely connected to the base 100.

The module assembly 200 may comprise at least one module configured to accommodate different or identical consumable products to be supplied to the users or accommodate trash. The consumable products may include paper products (e.g., toilet paper, wet wipes, tissues, napkins, or maxi roll towels), sanitizers, menstrual products, or other cleaning/sanitary products. The trash may include the used paper products or the used menstrual products.

Each module may have substantially same width, length, and/or height. In other words, each module may have a standard size so that each module may be replaced by other modules, regardless of the functions performed by the modules.

Figure 3A:
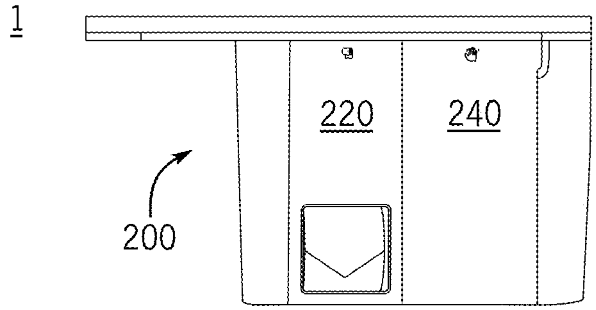
FIG. 3A illustrates a default configuration of the module assembly comprising a second module and a fourth module according to an embodiment of the present disclosure.
Figure 3B:
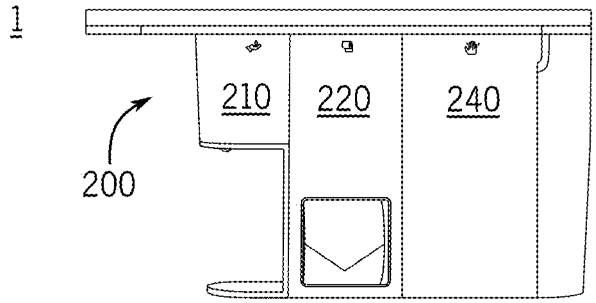
FIG. 3B illustrates a configuration of the module assembly comprising a first module, the second module, and the fourth module according to an embodiment of the present disclosure.
Figure 3C:
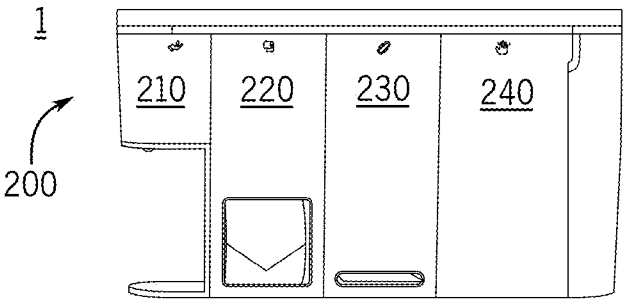
FIG. 3C illustrates a configuration of the module assembly comprising the first module, the second module, the third module, and the fourth module according to an embodiment of the present disclosure.
Figure 4:
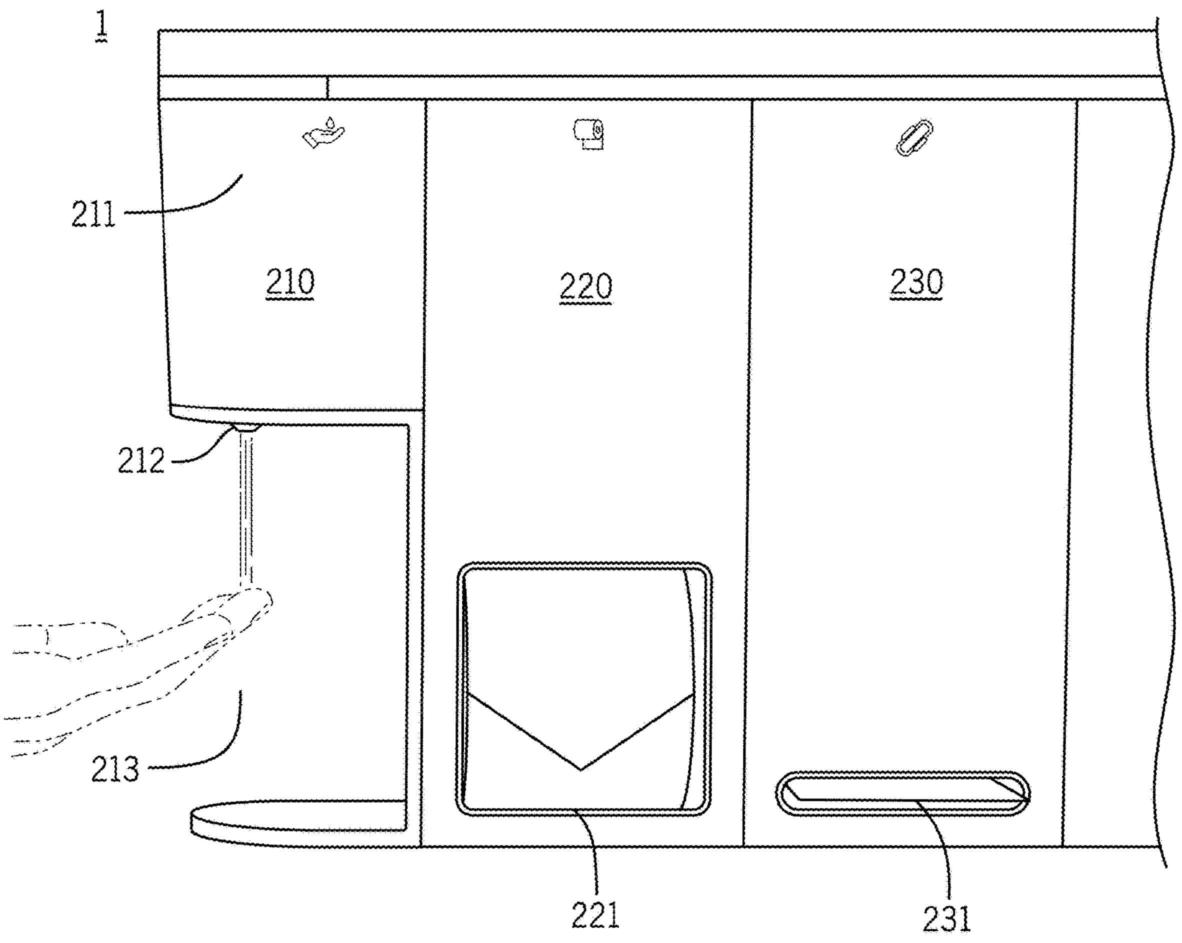
FIG. 4 is an enlarged view illustrating the first module, the second module, and the third module of the module assembly.
Figure 5:
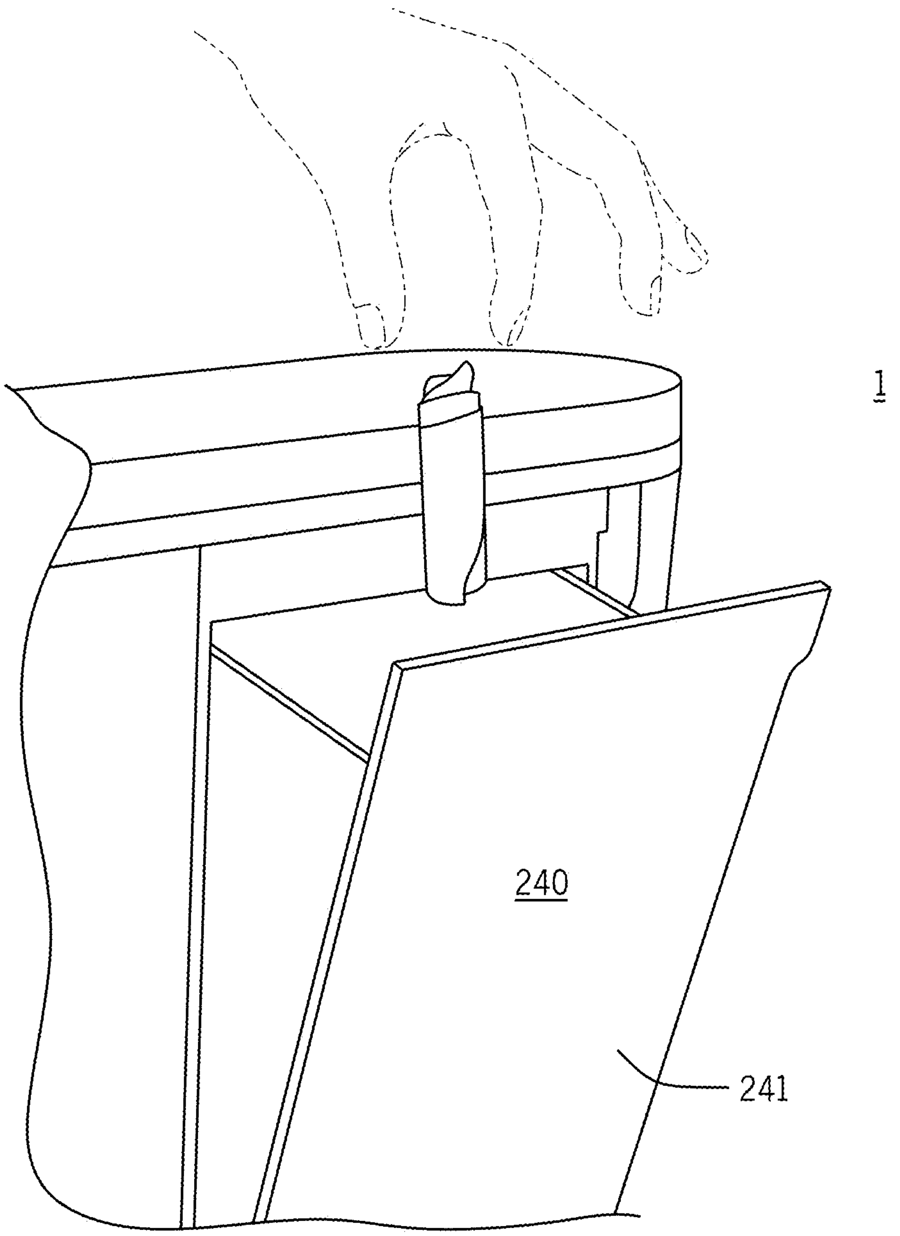
FIG. 5 is an enlarged view illustrating the fourth module of the module assembly.
Figure 6A:
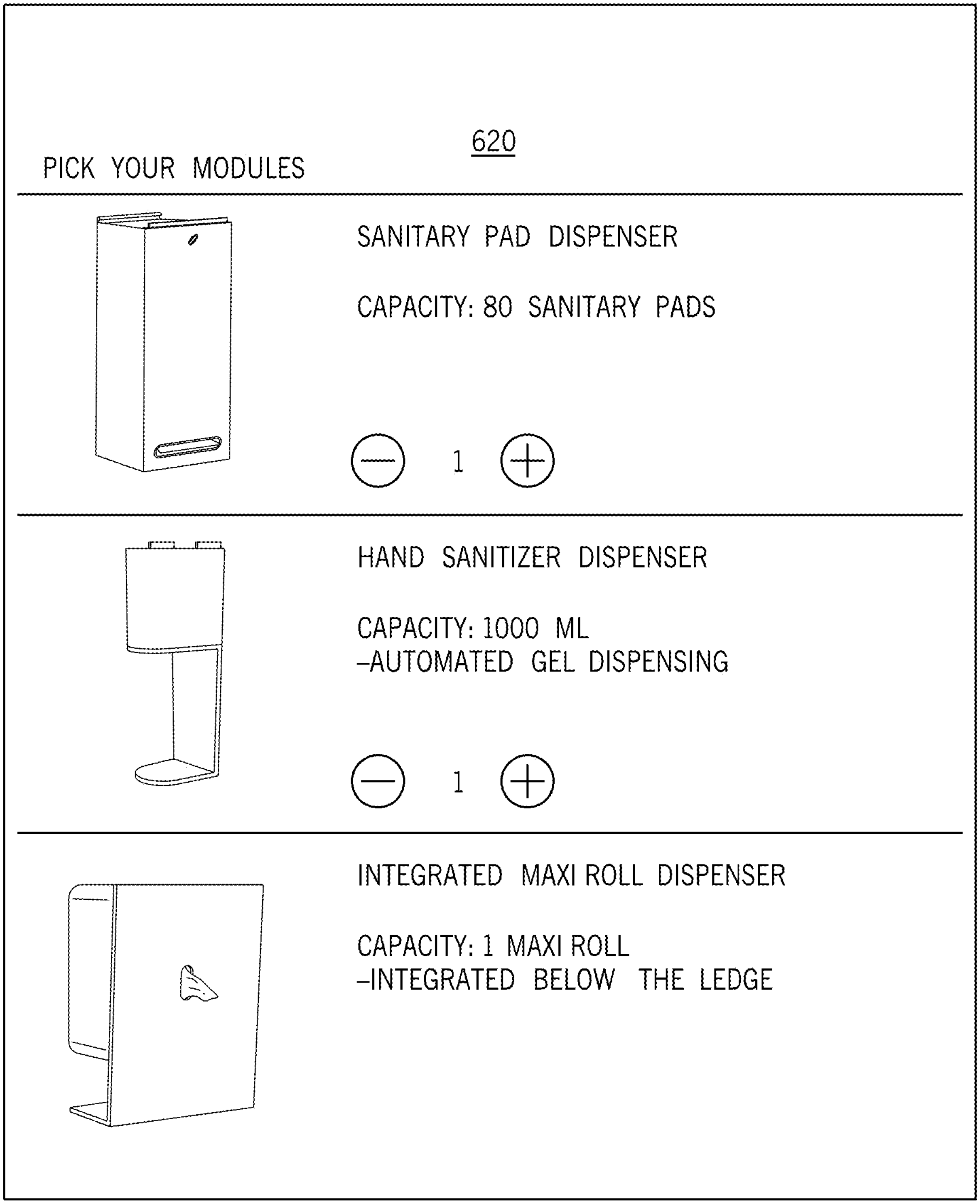
FIGS. 6A and 6B illustrate a selection of the module assembly on a user interface.
Figure 6B:
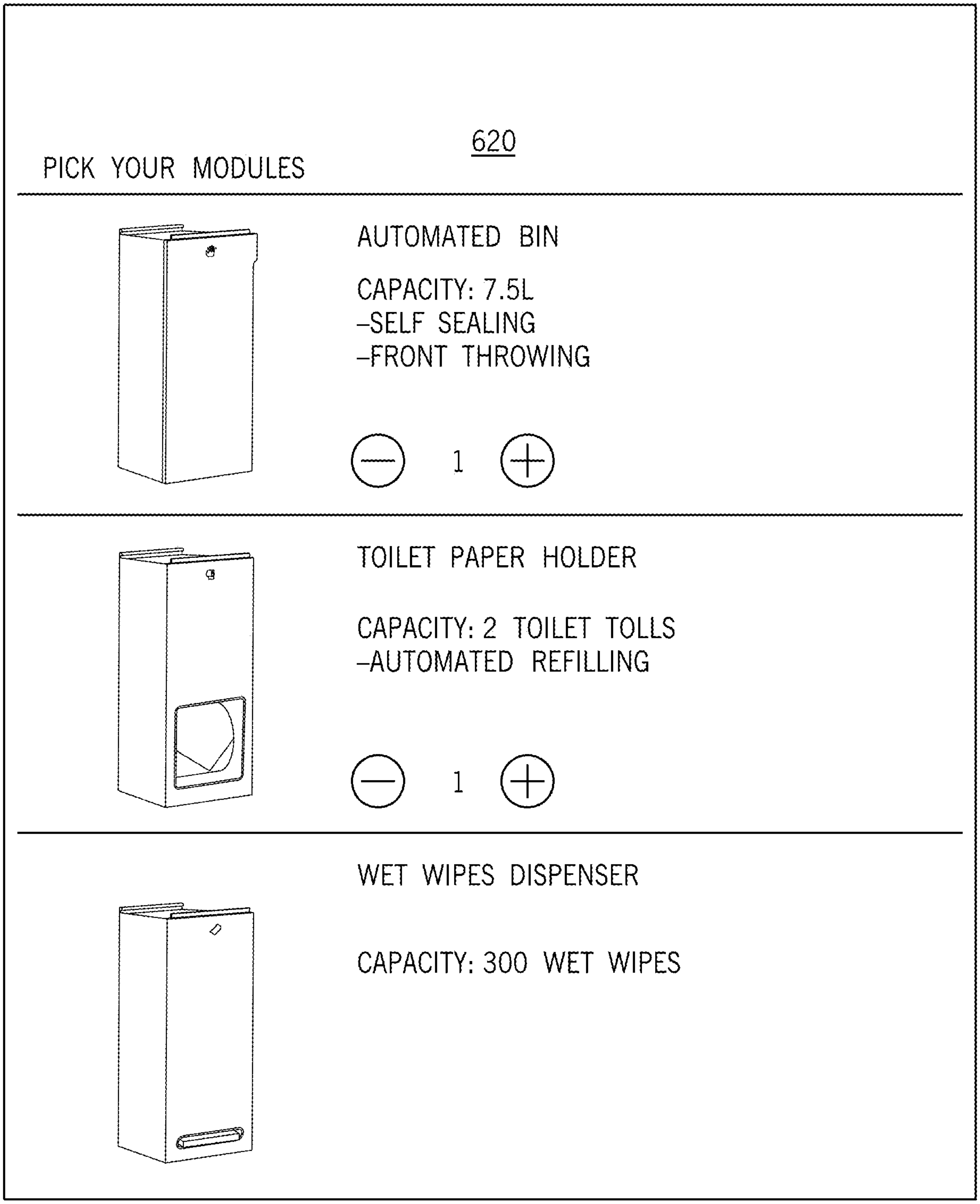
Figure 7:
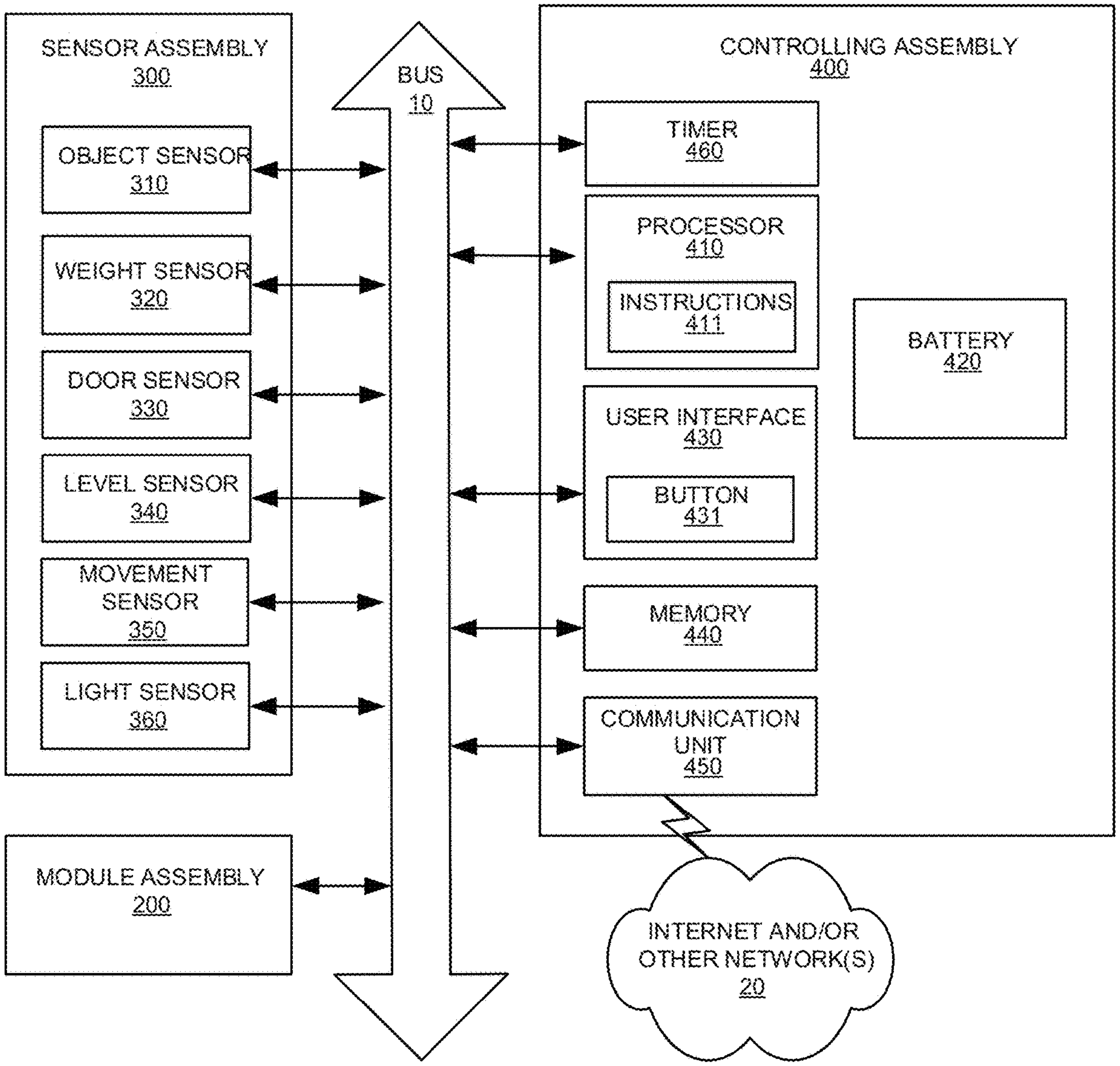
FIG. 7 is a block diagram illustrating the structure of a sensor assembly of the bathroom modular device and the structure of a processor of the bathroom modular device according to an embodiment of the present disclosure.

FIG. 3A illustrates a configuration of the module assembly 200 comprising a second module 220 and a fourth module 240 according to an embodiment of the present disclosure. FIG. 3B illustrates a configuration of the module assembly 200 comprising a first module 210, the second module 220, and the fourth module 240 according to an embodiment of the present disclosure. FIG. 3C illustrates a configuration of the module assembly 200 comprising the first module 210, the second module 220, the third module 230, and the fourth module 240 according to an embodiment of the present disclosure. FIG. 4 is an enlarged view illustrating the first module 210, the second module 220, and the third module 230 of the module assembly 200. FIG. 5 is an enlarged view illustrating the fourth module 240 of the module assembly 200. FIGS. 6A and 6B a drawing illustrating a selection of the module assembly on a user interface 620. FIG. 7 is a block diagram illustrating the structure of a sensor assembly 300 of the bathroom modular device and the structure of a processor of the bathroom modular device according to an embodiment of the present disclosure.

Further referring to FIGS. 3A-3C, 4, 5, 6A, 6B, and 7, in an embodiment, the module assembly 200 comprises a first module 210 configured to be activated by the sensor assembly 300 to dispense the cleaning products, e.g., hand sanitizers. The first module 210 comprises a container 211 configured to receive the cleaning products. The first module 210 further comprises a spray head 212 or dispenser disposed on a lower surface of the container 211 and configured to dispense the cleaning products. The first module 210 further comprises a recess or groove 213 disposed below the spray head 212 and configured to receive a hand of the user.

Therefore, by using the first module 210, the users may clean their hands immediately before or after changing menstruation products or touching the toilet seats, the door handles of the toilet cubicles, and the surfaces of the module assembly 200.

The first module 210 further comprises a lid 214 (referring to FIG. 1B) disposed in the opening 140 of the base 100. Thus, the maintenance person may open the lid 214 to refill the container 211 with new cleaning product when the cleaning product is used up.

In another embodiment, the first module 210 may include a button configured to open the first module 210. Specifically, when the maintenance person presses the button, the first module 210, which is the outermost module of the module assembly 200, is unlocked to slide from one end of the base 100. Then, the maintenance person may refill the container 211 with new cleaning product or perform maintenance services, e.g., components or replacements of the electronic elements installed in the first module 210 or disposed on a printed circuit board (such as an object sensor 310, a weight sensor 320, a lever sensor 340, a movement sensor 350, or a light sensor 360 as described below). In this embodiment, the base 100 does not need to include the opening 140 to receive the lid 214.

In an embodiment, the module assembly 200 further comprises a second module 220 configured to receive and dispense consumable products. The consumable products may include the paper product, e.g., toilet paper, wet wipes, tissues, napkins, or maxi roll towels. For example, the second module 220 may hold up to two rolls of toilet paper and thus provide a long-lasting supply. The second module 220 comprises an opening 221 configured to allow the paper products to dispense out of the second module 220 manually or automatically. In another embodiment, the module assembly 200 may comprise a plurality of second modules 220, each configured to receive and dispense each of the above products. For example, the plurality of second modules 220 may comprise a toilet paper dispenser, a wet wipes dispenser, a tissue dispenser, a napkin dispenser, and a maxi roll towel dispenser.

Figure 12:
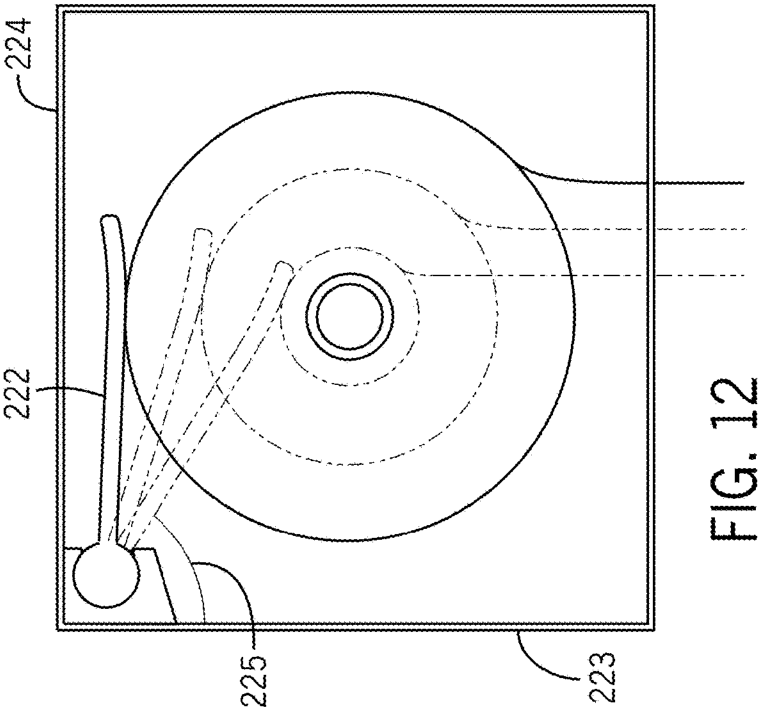
FIG. 12 illustrates the lever in different positions when an amount of toilet paper is full, medium, and low according to an embodiment of the present disclosure.
Figure 11:
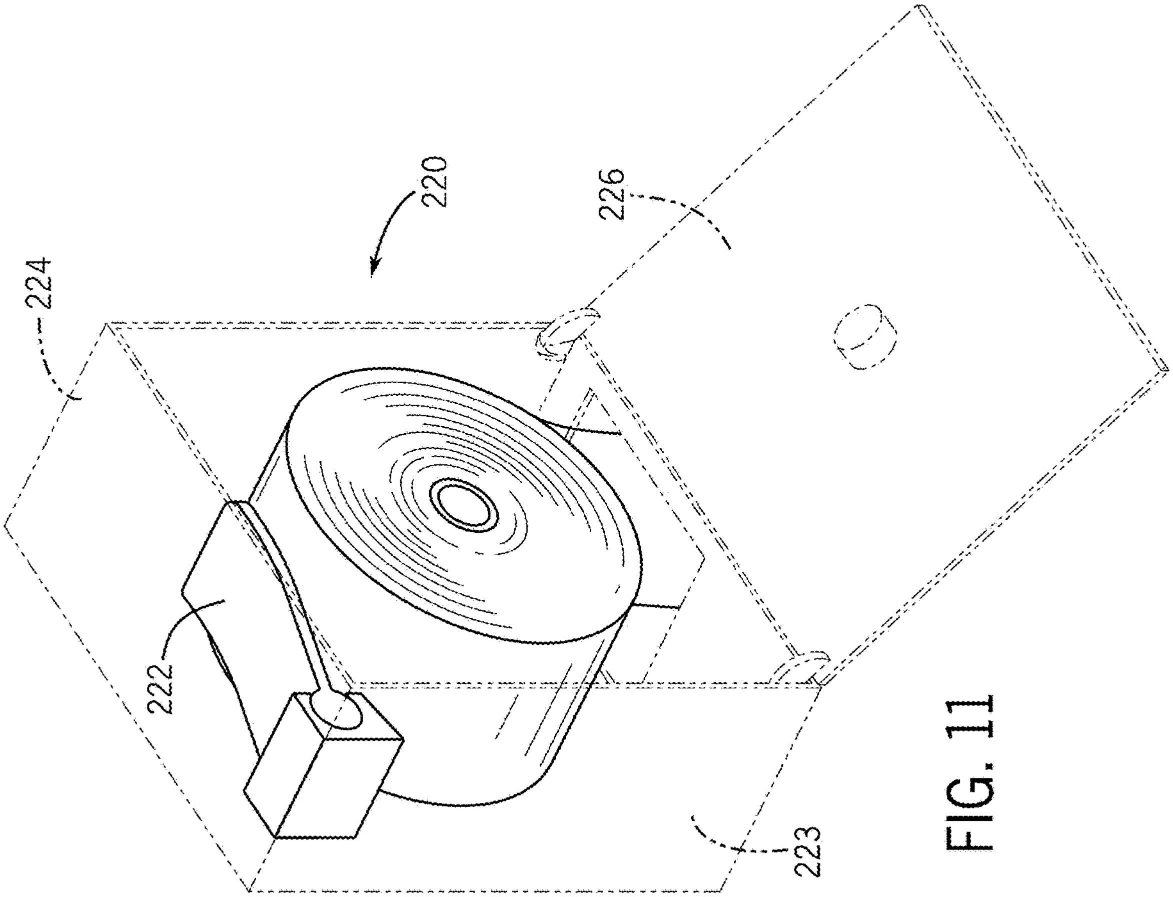
FIG. 11 illustrates a second module, including a lever, of the module assembly according to an embodiment of the present disclosure.

FIG. 11 illustrates a second module, including a lever, of the module assembly according to an embodiment of the present disclosure. FIG. 12 illustrates the lever in different positions when an amount of toilet paper is full, medium, and low according to an embodiment of the present disclosure.

In another embodiment, as shown in FIG. 11 and FIG. 12, the second module 220 may further comprise a lever 222 configured to determine an amount of the toilet paper in the second module 220. Specifically, the lever 222 may include an elongated arm. A first end of the lever 222 may be pivotably connected to a corner formed by a wall 223 and a ceiling 224 of the second module 220. A second end of the lever 222 is attached to an outer surface of the toilet paper in the second module 220.

Under the gravity, the second end of the lever 222 may remain attached to the outer surface of the toilet paper in the second module 220 when the user pulls out the toilet paper or the maintenance person installs a new roll of the toilet paper. In another embodiment, a spring may be attached to the lever 222 and configured to pull the second end of the lever 222 towards the wall 223. Thus, the second end of the lever 222 may remain attached to the outer surface of the toilet paper in the second module 220 when the user pulls out the toilet paper or the maintenance person installs a new roll of the toilet paper.

When the amount of the toilet paper is decreased, a thickness of the toilet paper is also decreased and thus an angle 225 of the lever 222 with respect to the wall 223 becomes smaller. When the amount of the toilet paper is increased, the thickness of the toilet paper is also increased and thus the angle 225 of the lever 222 with respect to the wall 223 becomes larger.

A sensor may be connected to the lever 222 and configured to detect a size of the angle 225. The sensor may be also communicably connected to a processor 410 of the controlling assembly 400. When the angle 225 is larger than or equal to a first predetermined angle or degree, e.g., 60 degrees, the processor 410 may determine that the amount of the toilet paper is full. When the angle 225 is smaller than the first predetermined angle or degree and larger than or equal to a second predetermined angle or degree, e.g., 30 degrees, the processor may determine that the amount of the toilet paper is medium. When the angle 225 is smaller than second predetermined degree, the processor 410 may determine that the amount of the toilet paper is low. The first and second predetermined degrees may be any degrees as long as the first predetermined degree is larger than the second predetermined degree.

The processor 410 may inform the maintenance person of a status of the toilet paper, i.e., whether the amount of the toilet paper is full, medium, or low. Thus, the maintenance person may plan when to install a new roll of toilet paper in the second module 220 according to the status of the toilet paper.

In another embodiment, a bottom surface, facing the toilet paper, of the lever 222 may be lined with any fiction materials, e.g., Delrin or Nylon material. Thus, the lever 222 may provide a fiction on attached to the outer surface of the toilet paper when the second end of the lever 222 may remain attached to the outer surface of the toilet paper. The friction may prevent the user from pulling out too much toilet paper and thus save the toilet paper.

In this embodiment, as shown in FIG. 11, a door 226 is pivotably hinged to a lower end of the second module 220. Thus, the user and the maintenance person may open the door 226 when the user needs to pull out the toilet paper and the maintenance person needs to install a new roll of the toilet paper in the second module 220. The second module 220 may further include a button configured to allow the user and the maintenance person to open the door 226. Specifically, when the maintenance person presses the button, the door 226 is unlocked to turn outwards (i.e., towards the maintenance person or the user) so that the door 226 can be opened. In this embodiment, the second module 220 does not need to include the opening 221 for the user to pull out the toilet paper. Likewise, Thus, the base 100 does not need to include the opening 140 for the maintenance person to install a new roll of the toilet paper in the second module 220.

In an embodiment, the module assembly 200 further comprises a third module 230 configured to dispense the menstrual products, e.g., pads or tampons, for the female users. For example, the third module 230 may hold up to eighty pieces of menstrual products and thus provide a long-lasting supply. The third module 230 comprises an opening 231 configured to allow the menstrual products to dispense out of the third module 230 manually or automatically.

In another embodiment, the third module 230 may have the same function as the second module 220. In other words, the third module 230 may also be configured to dispense the consumable products, e.g., toilet paper, wet wipes, tissues, napkins, or maxi roll towels. The third module 230 have the same structure as the second module 220. The detailed descriptions of the module assembly 220 has been provided above and thus the third module 230 in this embodiment is omitted herein.

In an embodiment, the module assembly 200 further comprises a fourth module 240 configured to receive the trash, e.g., a trash bin. The fourth module 240 comprises a door 241 configured to be opened or closed manually or automatically. In another embodiment, the fourth module 240 further comprises a charcoal dehumidifier configured to remove the odor caused by the trash. When the door 241 is opened or closed automatically, a motor 470 of the controlling assembly 400, as shown in FIG. 1A, may control the door 241 to open or close. The motor 470 is further described in more details with reference to FIG. 7.

In another embodiment, at least one roller may be disposed on each side of the door 241 to facilitate the opening and closing of the door 241.

Therefore, the bathroom modular device 1 according to the present disclosure may provide all functions within a compact and neat configuration. The bathroom modular device 1 according to the present disclosure may also provide all functions within a hand-reachable distance and thus the users no longer need to turn their bodies to different directions. This configuration gives the users a more pleasant, convenient, and odorless experience when the users use the public bathrooms. In addition, the bathroom modular device 1 may maintain the hands of the users clean even when the users manually control the module assembly 200 because the hands of the users may be immediately cleaned by the cleaning products.

In another embodiment, the module assembly 200 may comprise two fourth module 240 and thus the trash of the used paper products and the trash of the used menstrual products may be respectively received in the two fourth modules 240.

In another embodiment, the maintenance person or the users may select any combinations or configurations of the modules of the module assembly 200 according to the needs of the users. For example, according to a configuration, the module assembly 200 may only comprise the second module 220 configured to receive and dispense the paper products and the fourth module 240 configured to receive the trash to meet the basic needs of the users (see FIG. 3A). In another example, when the bathroom modular device 1 is installed in a bathroom for the male users, the module assembly 200 may comprise, the first module 210, the second module 220, and the fourth module 240 without including the third module 230 (see FIG. 3B). Alternatively, the third module

230 may be filled with the product dedicated for the male users. In another example, when the bathroom modular device 1 is installed in a bathroom of a hotel for the female users, the module assembly 200 may comprise the first module 210, the second module 220, the third module 230, and the fourth module 240 to provide a premium configuration for the users (see FIG. 3C). For example, the premium configuration may be set up in a high traffic shopping mall, a modern office building, and a high-end hotel.

In an embodiment, when the bathroom modular device 1 is installed in a mall (e.g., a shopping mall), the maintenance person and/or the users may customize the configuration of the bathroom modular device 1. For example, the bathroom modular device 1 may comprise a trash bin, a maxi roll towel dispenser, a sanitary pad dispenser, and a hand sanitizer dispenser. In another example, the bathroom modular device 1 may comprise a trash bin and a maxi roll towel dispenser. In another example, the bathroom modular device 1 may comprise a trash bin and a toilet paper dispenser.

In an embodiment, when the bathroom modular device 1 is installed in an office, the maintenance person and/or the users may customize the configuration of the bathroom modular device 1. For example, the bathroom modular device 1 may comprise a trash bin, a toilet paper dispenser, a sanitary pad dispenser, a wet wipe dispenser, and a hand sanitizer dispenser. In another example, the bathroom modular device 1 may comprise a trash bin, a sanitary pad dispenser, and a toilet paper dispenser. In another example, the bathroom modular device 1 may comprise a trash bin and a toilet paper dispenser.

In an embodiment, when the bathroom modular device 1 is installed in a hotel, the maintenance person and/or the users may customize the configuration of the bathroom modular device 1. For example, the bathroom modular device 1 may comprise a trash bin, a toilet roll dispenser, a sanitary pad dispenser, a wet wipe dispenser, and a hand sanitizer dispenser. In another example, the bathroom modular device 1 may comprise a trash bin, a sanitary pad dispenser, and a hand sanitizer dispenser. In another example, the bathroom modular device 1 may comprise a trash bin and a sanitary pad dispenser. In another example, the bathroom modular device 1 may comprise a trash bin and a toilet paper dispenser.

In another embodiment, the selection may be performed by a user interface installed on an electronic device, e.g., computer, cell phone, iPad etc. The user interface may display the prices for each module and display the selected configuration of the modules (see FIGS. 6A and 6B).

In another embodiment, the maintenance person or the users may select the material, color, pattern, and finish of the base 100, the module assembly 200, and the lid 500. The material may be at least one of plastic, wood, marble, metal, or any antibacterial or antimicrobial materials.

As shown in FIGS. 6A and 6B, the user interface 620 displays a menu for the maintenance person or the users to select modules. The available modules include a sanitary pad dispenser, a hand sanitizer dispenser, an integrated maxi roll dispenser, an automated bin, a toilet paper holder, and a wet wipe dispenser. The user interface 620 may further display the capacities, key features, and prices for the modules.

In an embodiment, the user interface 620 in FIGS. 6A and 6B may be a user interface 620 as discussed below. In another embodiment, the user interface 620 in FIGS. 6A and 6B may be a separate user interface communicably connected to a server 3 as discussed below. In another embodiment, the maintenance person or the users may use the user interface 620 to make a payment for the selection.

In response to the selection and/or the payment, the server 3 may instruct a service provider, who manages or sells the modules, to deliver or install the selected modules in the bathroom.

Therefore, the maintenance person and/or the users may customize the configuration of the bathroom modular device 1 to meet the different needs of the users and thus an elegant, gracious, and thoughtful experience may be provided.

In an embodiment, the sensor assembly 300 of the bathroom modular device 1 comprises at least one object sensor 310 configured to detect an object, e.g., a hand of the user. For example, the at least one object sensor 310 may detect whether the object is present within a detection range of the object sensor 310. The at least one object sensor 310 may detect a distance between the detected object and the at least one object sensor 310. In this embodiment, each of first module 210, the second module 220, the third module 230, and the fourth module 240 may comprise a respective object sensor 310.

Based on the distance data obtained by the at least one object sensor 310, it may be determined whether to control the first module 210, the second module 220, or the third module 230 to dispense the corresponding product or whether to control the fourth module 240 to open the door 241.

To this end, the distance data for each of the first module 210, the second module 220, the third module 230, and the fourth module 240 may be compared with a respective predetermined distance.

Therefore, by such a touchless configuration, the bathroom modular device 1 according to the present disclosure may reduce or eliminate the health risks for the users to get infected with the pathogens when the users use the module assembly 200.

In another embodiment, the users may manually control the module assembly 200 to dispense the corresponding product from the first module 210, the second module 220, or the third module 230. The users may manually open and/or close the door 241 of the fourth module 240.

In an embodiment, the module assembly 200 may further include a module configured to dispense anti-smell material or air refreshener. In another embodiment, a module for dispensing the anti-smell material or the air refreshener may be an air refreshener puck storage configured to house the anti-smell material or air refreshener.

The anti-smell material or the air refreshener may be automatically dispensed at a predetermined time interval or dispensed in response to a user's command, e.g., through a button on the module or the controlling assembly 400.

In an embodiment, the sensor assembly 300 of the bathroom modular device 1 further comprises at least one weight sensor 320 configured to measure a weight of the corresponding product in the first module 210, the second module 220, or the third module 230 and/or measure a weight of the trash in the fourth module 240. Based on the weight data obtained by the weight sensor 320, it may be determined whether to control the first module 210, the second module 220, or the third module 230 to dispense the corresponding product or whether to control the fourth module 240 to open the door 241. Based on the weight data obtained by weight sensor 320, it may be determined whether to notify the maintenance person that the first module 210, the second module 220, or the third module 230 should be refilled with the corresponding product or whether to notify the maintenance person that the trash should be removed from the fourth module 240.

To this end, the weight data for each of the first module 210, the second module 220, the third module 230, and the fourth module 240 may be compared with a respective predetermined weight.

The predetermined weights for the first module 210, the second module 220, the third module 230, and the fourth module 240 may be set according to a volume of the internal space of each module. In another embodiment, the predetermined weights for the first module 210, the second module 220, and the third module 230 may be set according to the types of the products received in these modules.

In an embodiment, the sensor assembly 300 of the bathroom modular device 1 further comprises at least one door sensor 330 configured to detect whether the door 241 of the fourth module 240 is opened. In another embodiment, the at least one door sensor 330 is further configured to detect how many times the door 241 has been opened. Based on the door data obtained by the door sensor 330, it may be determined whether to control the fourth module 240 to open the door 241. Based on the door data obtained by door sensor 330, it may be determined whether to notify the maintenance person that the trash should be removed from the fourth module 240.

To this end, the door data for the fourth module 240 may be compared with a predetermined time period. In another embodiment, the door data for the fourth module 240 may be compared with a predetermined number.

Therefore, the bathroom modular device 1 according to the present disclosure may monitor in-real time the supplies and the trash in the bathroom and eliminate the needs for the maintenance person to check the bathroom periodically. Before or immediately after the products are used up or the trash fill up all internal spaces of the fourth module 240, the maintenance person may perform the corresponding maintenance work timely. Thus, the bathroom modular device 1 may avoid the embarrassing situation caused by the shortage of the products. In addition, the bathroom modular device 1 may maintain a clean and hygienic environment in the bathroom and thus reduce the possibility of spreading pathogens contained in the trash.

In an embodiment, the sensor assembly 300 of the bathroom modular device 1 further comprises at least one level sensor 340 configured to detect a level (e.g., liquid depth) of the cleaning product in the first module 210. Based on the level data obtained by the level sensor 340, it may be determined whether to control the first module 210 to dispense the cleaning product and whether to notify the maintenance person that the first module 210 should be refilled with the cleaning product.

In an embodiment, the sensor assembly 300 of the bathroom modular device 1 further comprises at least one movement sensor 350 configured to detect a movement of the corresponding product in the first module 210, the second module 220, or the third module 230 and/or detect a movement of the trash in the fourth module 240. The movement may be the movement of the products caused by the dispensation of the products and the movement of the trash caused by the accumulation of the trash. Movement values (e.g., the number of movements and the amplitudes/sizes of movements) of a respective product may be summed up every time the movement of the respective product occurs.

Based on the movement data obtained by the movement sensor 350, it may be determined whether to control the first module 210, the second module 220, or the third module 230 to dispense the corresponding product or whether to control the fourth module 240 to open the door 241. Based on the movement data obtained by movement sensor 350, it may be determined whether to notify the maintenance person that the first module 210, the second module 220, or the third module 230 should be refilled with the corresponding product or whether to notify the maintenance person that the trash should be removed from the fourth module 240.

To this end, the movement data for each of the first module 210, the second module 220, the third module 230, and the fourth module 240 may be compared with a respective predetermined movement value. The predetermined movement value may comprise a predetermined number of movements and a predetermined amplitude of movements.

In an embodiment, the sensor assembly 300 of the bathroom modular device 1 further comprises at least one light sensor 360 configured to detect a light intensity in the first module 210, the second module 220, the third module 230, or the fourth module 240. In this embodiment, the sensor assembly 300 may comprises a light emitter configured to emit the light into the internal spaces of the first module 210, the second module 220, the third module 230, and the fourth module 240.

When the amount of the product in the first module 210, the second module 220, or the third module 230 is decreased, the corresponding light intensity in the first module 210, the second module 220, or the third module 230 is increased because less light is blocked by the product. When the amount of the trash in the fourth module 240 is increased, the corresponding light intensity in the fourth module 240 is decreased because more light is blocked by the trash.

Based on the light intensity data obtained by the light sensor 360, it may be determined whether to control the first module 210, the second module 220, or the third module 230 to dispense the corresponding product or whether to control the fourth module 240 to open the door 241. Based on the light intensity data obtained by light sensor 360, it may be determined whether to notify the maintenance person that the first module 210, the second module 220, or the third module 230 should be refilled with the corresponding product or whether to notify the maintenance person that the trash should be removed from the fourth module 240.

To this end, the light intensity data for each of the first module 210, the second module 220, the third module 230, and the fourth module 240 may be compared with a respective predetermined light intensity value.

In an embodiment, the controlling assembly 400 of the bathroom modular device 1 is disposed in the opening 140 of the base 100. The controlling assembly 400 comprises a processor 410, a battery 420 configured to supply the power to the processor 410, and a user interface 430 configured to receive operation commands input by the users.

In another embodiment, as shown in FIG. 2D, the controlling assembly 400 may be disposed in a fifth module 250 of the module assembly 200. The fifth module 250 may include a first button configured to control a door of the fifth module 250 to open or close. Like the door 226 of the second module 220, the door of the fifth module 250 may be pivotably hinged to a lower end of the fifth module 250. Specifically, when the maintenance person presses the first button, the door of the fifth module 250 is unlocked to turn outwards (i.e., towards the maintenance person or the user) so that the door of the fifth module 250 can be opened. When the door of the fifth module 250 is opened, the maintenance person may perform maintenance services, e.g., repairments or replacements of the electronic elements installed in the fifth module 250 or disposed on a printed circuit board (such as the controlling assembly 400). In this embodiment, the base 100 does not need to include the opening 140 to receive the controlling assembly 400.

In order to avoid falsely triggering and the sensor assembly 300 when the maintenance person repairs or replaces any sensors of the sensor assembly 300, the fifth module 250 may include a second button configured to deactivate each sensor of the sensor assembly 300. Thus, when the maintenance person presses the second button, all sensors of the sensor assembly 300 may be deactivated at the same time. When the maintenance person completes the repairment or the replacement, the maintenance person may press the second button again to activate all sensors of the sensor assembly 300 at the same time.

In another embodiment, the door 226 of the second module 220 and the door 241 of the fourth module 240 may also be opened in response to the pressing of the second button. When the maintenance person completes the repairment or the replacement, the maintenance person may press the second button again to close the door 226 of the second module 220 and the door 241 of the fourth module 240 at the same time.

In another embodiment, only one button may be included in the fifth module 250. In other words, when the maintenance person presses the only one button, the door of the fifth module 250 may be unlocked, the sensor assembly 300 may be deactivated, and/or the door 226 of the second module 220 and the door 241 of the fourth module 240 may be closed at the same time.

In another embodiment, the first module 250, which is the outermost module of the module assembly 200, may be unlocked to slide from one end of the base 100 so that the electronic elements installed in the fifth module 250 or disposed on a printed circuit board (such as the controlling assembly 400) may be repaired or replaced separately.

In an embodiment, the processor 410 of the controlling assembly 400 is configured to control the module assembly 200 or notify the maintenance person in response to the detecting results, e.g., the distance data, the weight data, the door data, the level data, the movement data, and/or the light intensity data, obtained by the sensor assembly 300.

To this end, the processor 410 may send instructions 411 to the first module 210, the second module 220, the third module 230, or the fourth module 240 to control the corresponding module and send the instructions 411 to a communication unit 450 to notify the maintenance person. The structures and functions of the controlling assembly will be further described in view of the bathroom managing system 2 below. In this embodiment, the processor 410 may be an Internet of Things (IOT) module.

For example, when the processor 410 determines that the distance between the detected object and an object sensor 310 is smaller than the respective predetermined distance, the processor 410 may control the corresponding module among the first module 210, the second module 220, and the third module 230 to dispense the corresponding product or control the fourth module 240 to open the door 241.

For example, when the processor 410 determines that the weight of the corresponding product in the first module 210, the second module 220, or the third module 230 is smaller than the respective predetermined weight or determines that the weight of the trash in the fourth module 240 is larger than the respective predetermined weight, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

For example, when the processor 410 determines that the door 241 of the fourth module 240 is in an open status for a time period longer than the predetermined time period or the door 241 has been opened for more than the predetermined number, the processor 410 may generate the instructions 411 to notify the maintenance person that the trash should be removed from the fourth module 240. In another embodiment, the processor 410 may generate the instructions 411 to notify the maintenance person that the fourth module 240 should be checked.

For example, when the processor 410 determines the level of the cleaning product in the first module 210 is lower than the predetermined level, the processor 410 may prevent the first module 210 from dispensing the cleaning product. In this case, the processor 410 may generate the instructions 411 to notify the maintenance person that the first module 210 should be refilled with the cleaning product. In another embodiment, the processor 410 may generate the instructions 411 to notify the maintenance person that the first module 210 should be checked.

For example, when the processor 410 determines that the summed movement value of the corresponding product in the first module 210, the second module 220, or the third module 230 or the summed movement value of the trash in the fourth module 240 is larger than the respective predetermined movement value, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

For example, when the processor 410 determines that the light intensity value in the first module 210, the second module 220, or the third module 230 is larger than the respective predetermined light intensity value or the light intensity value in the fourth module 240 is smaller than the respective predetermined light intensity value, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

In an embodiment, the battery 420 of the controlling assembly 400 is configured to supply the power to each element of the controlling assembly 400.

In an embodiment, the user interface 430 of the controlling assembly 400 is communicably connected to the processor 410 and configured to receive operation commands input by the users and communicably connected to the processor 410. When the users need help from the maintenance person, the users may use the user interface 430, e.g., the button 431, to generate a refilling request, a cleaning request, and/or a checking request to the maintenance person.

Therefore, when the maintenance person fails to perform the maintenance work timely, the users may obtain, without leaving the toilet cubicles, immediate help the maintenance person to avoid the panicking situations. Thus, the privacy of the users may be protected.

In an embodiment, the lid 500 of the bathroom modular device 1 is configured to be opened or closed by the maintenance person. The lid 500 may be a ledge having a width equal to or larger than the width of the module assembly 200.

Therefore, the lid 500 may provide a dedicated top platform for users' personal belongings when the lid 500 is closed. Thus, the users may place their personal belongings, e.g., cell phones, bags etc. on the lid 500. For example, the lid 500 may be a preparation place for the female users before they change the new pads.

When the lid 500 is opened, the maintenance person may refill the first module 210, the second module 220, or the third module 230 with the corresponding product, remove the trash from the fourth module 240, and change the battery 420 of the controlling assembly 400.

When the lid 500 is closed, the lid 500 may be spaced from the floor at a height of about 70 cm to about 90 cm. The bathroom modular device 1 may be disposed below a handrail.

Therefore, the bathroom modular device 1 provides an easy access for the maintenance person to refill or clean the modules because the lid 500 may close or open all modules at the same time. Thus, this configuration may improve the work efficiency for the maintenance person.

In another embodiment, to simplify the structure and reduce the manufacturing costs, the lid 500 may not be included in the bathroom modular device 1. The plurality of the openings 140 may not be included in the base 100. Specifically, the base 100 does not need to include the opening 140 to receive the lid 214. The base 100 does not need to include the opening 140 for the maintenance person to install a new roll of the toilet paper in the second module 220. The base 100 does not need to include the opening 140 for the maintenance person to add new pads in the third module 220. The base 100 does not need to include the opening 140 to receive the controlling assembly 400.

Instead, the base 100 may be a board, which is connected to the wall. The upper surface of the base 100 may include a wireless charger configured to charge a cell phone of the user. The wireless charger may be embedded in or integrated into the base 100 so that the upper surface of the base 100 can be flat.

In another embodiment, the bathroom modular device 1 may be installed on the walls on either side of the toilet. To this end, the bathroom modular device 1 may have a symmetrical structure so that either surface of the bathroom modular device 1 may be installed on the wall. In the present disclosure, a front surface of the bathroom modular device 1 and a front surface of each module are defined by the surface facing the users as shown in FIGS. 1A, 1B, 3A, 3B, 3C and 4. A rear surface of the bathroom modular device 1 and a rear surface of each module are defined by the surface facing the wall of the bathroom as shown in FIGS. 1A, 1B, 3A, 3B, 3C and 4.

Specifically, when either the front surface of the bathroom modular device 1 or the rear surface of the bathroom modular device 1 may face the users, the object sensors 310 may be disposed on both surfaces of the bathroom modular device 1.

For example, two object sensors 310 for the first module 210 may be respectively disposed on the front surface of the first module 210 and the rear surface of the first module 210. Two object sensors 310 for the second module 220 may be respectively disposed on the front surface of the second module 220 and the rear surface of the second module 220. Two object sensors 310 for the third module 230 may be respectively disposed on the front surface of the third module 230 and the rear surface of the third module 230. Two object sensors 310 for the fourth module 240 may be respectively disposed on the front surface of the fourth module 240 and the rear surface of the fourth module 240.

In addition, two openings 221 of the second module 220 may be respectively disposed on the front surface of the second module 220 and the rear surface of the second module 220. Two openings 231 of the third module 230 may be respectively disposed on the front surface of the third module 230 and the rear surface of the third module 230. Two doors 241 of the fourth module 240 may be respectively disposed on the front surface of the fourth module 240 and the rear surface of the fourth module 240.

The controlling assembly 400 is configured to determine whether an object sensor 310 on the front surface or the rear surface is activated. Based on the determination, the controlling assembly 400 is further configured to control the second module 220 to dispense the paper products from the corresponding opening 221, control the third module 230 to dispense the menstrual products from the corresponding opening 231, and/or control the fourth module 240 to open the corresponding door 241. For example, when the controlling assembly 400 determines that the object sensor 310 disposed on the rear surface of the second module 220 is activated because the rear surface of the second module 220 faces the users, the controlling assembly 400 may control the second module 220 to dispense the paper products from the opening 221 disposed on the rear surface of the second module 220. For another embodiment, when the controlling assembly 400 determines that the object sensor 310 disposed on the rear surface of the third module 230 is activated because the rear surface of the third module 230 faces the users, the controlling assembly 400 may control the third module 230 to dispense the menstrual products from the opening 231 disposed on the rear surface of the third module 230. For another embodiment, when the controlling assembly 400 determines that the object sensor 310 disposed on the rear surface of the fourth module 240 is activated because the rear surface of the fourth module 240 faces the users, the controlling assembly 400 may control the fourth module 240 to open the door 241 disposed on the rear surface of the fourth module 240.

Therefore, due to the symmetrical structure of the bathroom modular device 1, the maintenance person does not have to determine which surface should face the users when installing the bathroom modular device 1.

2. Bathroom Managing System

Figure 8:
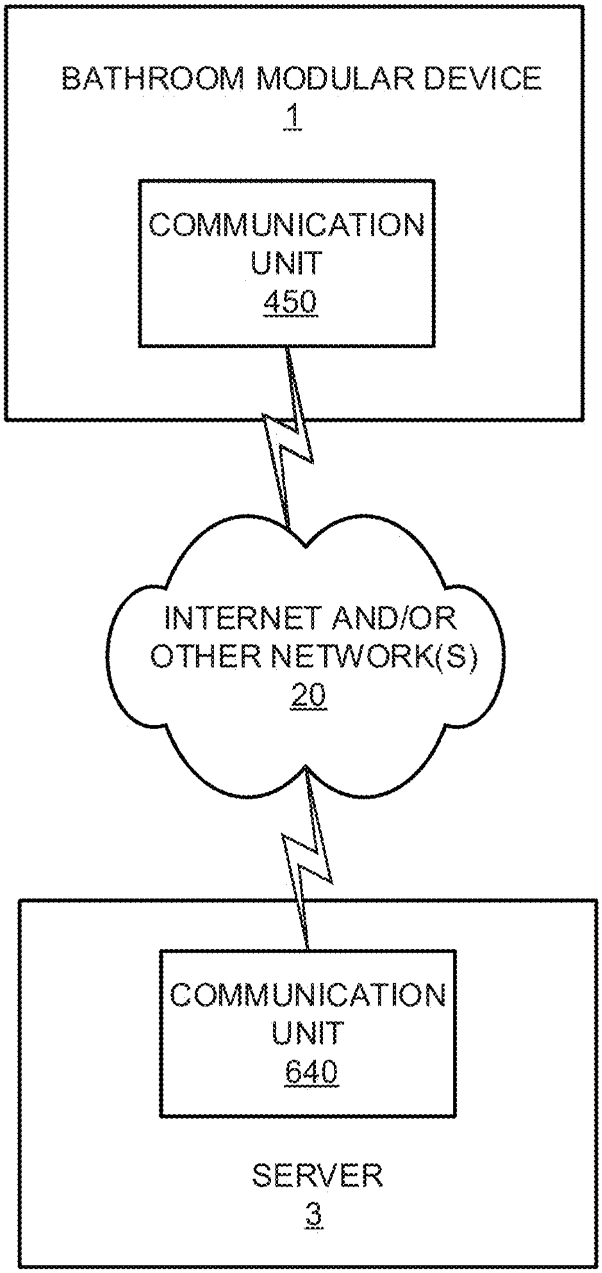
FIG. 8 is a block diagram illustrating a bathroom managing system comprising the bathroom modular device and a server according to an embodiment of the present disclosure.
Figure 9:
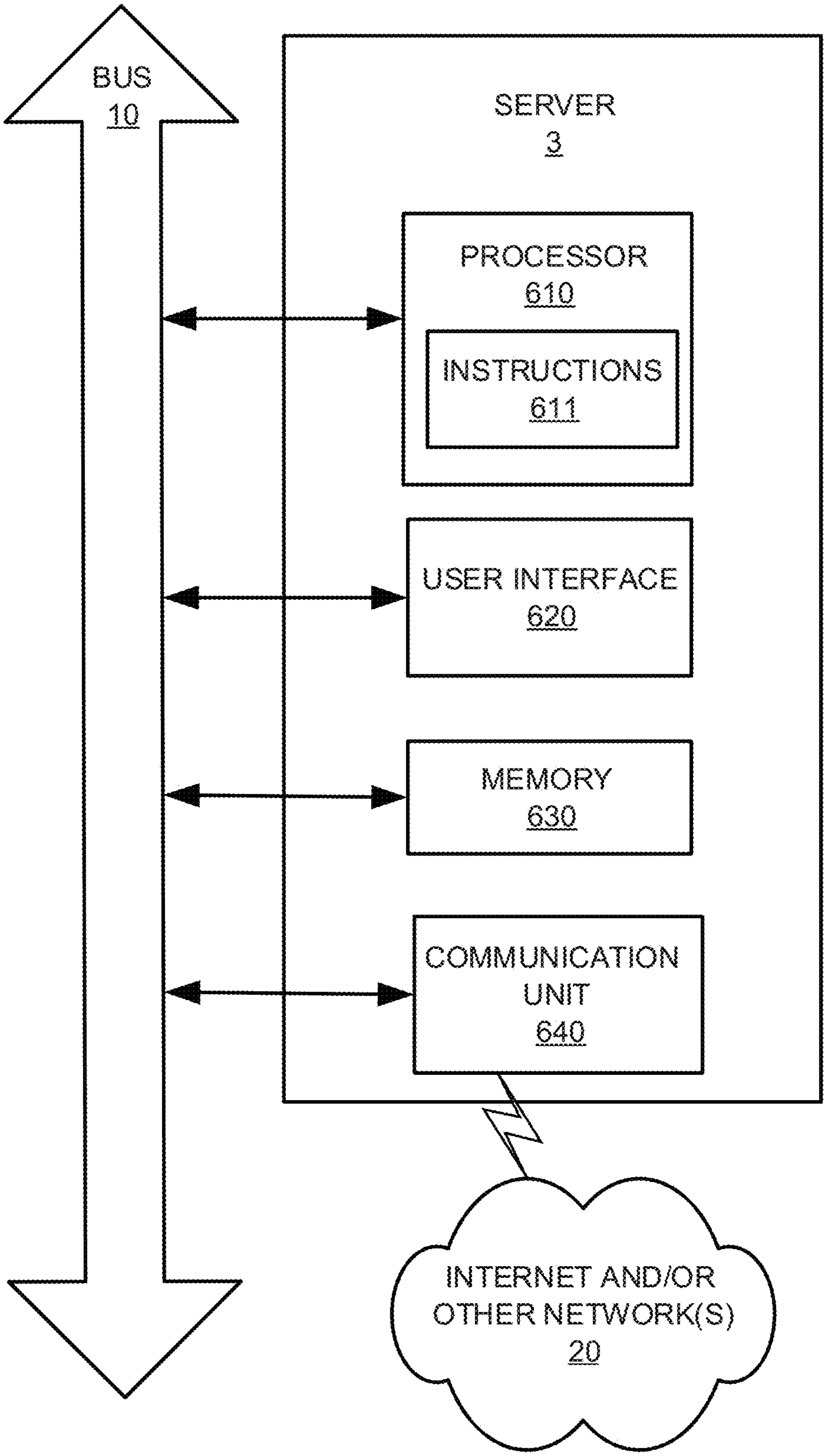
FIG. 9 is a block diagram illustrating the structure of the server according to an embodiment of the present disclosure.

FIG. 7 is a block diagram illustrating the structure of a sensor assembly 300 of the bathroom modular device 1 and the structure of a processor 410 of the bathroom modular device 1 according to an embodiment of the present disclosure. FIG. 8 is a block diagram illustrating a bathroom managing system comprising the bathroom modular device 1 and a server 3 according to an embodiment of the present disclosure. FIG. 9 is a block diagram illustrating the structure of the server 3 according to an embodiment of the present disclosure.

Referring to FIGS. 7-9, a bathroom managing system 2 according to the present disclosure comprises the bathroom modular device 1 as discussed above and a server 3 communicably connected to the bathroom modular device 1 via the internet 20 and/or other networks (hereinafter "network").

The bathroom modular device 1 is disposed at a user end of the bathroom managing system 2 and configured to collect, process, transmit data (e.g., the distance data, the weight data, the door data, and the operation commands), and transmit instructions 411. The server 3 is disposed at a server end of the bathroom managing system 2 and configured to receive the data and the instructions 411 and generate instructions 611 for the maintenance person in response to the instructions 411.

2.1 User End of Bathroom Managing System

In an embodiment, the bathroom modular device 1 according to the present disclosure comprises the module assembly 200, the sensor assembly 300, and the controlling assembly 400 communicably connected to the module assembly 200 and the sensor assembly 300. Each element of the sensor assembly 300 and each element of the controlling assembly 400 may be connected to a bus 10 to exchange instructions and/or data between or among the elements of the sensor assembly 300 and the elements of the controlling assembly 400.

The detailed descriptions of the module assembly 200 and the sensor assembly 300 have been provided above and thus omitted herein.

In an embodiment, the controlling assembly 400 comprises the processor 410 configured to generate the instructions 411, the battery 420 configured to supply the power to each element of the controlling assembly 400, the user interface 430 communicably connected to the processor 410, a memory 440 communicably connected to the processor 410, the communication unit 450 communicably connected to the processor 410, a timer 460 communicably connected to the processor 410, and a motor 470 communicably connected to the processor 410.

In an embodiment, the processor 410 of the controlling assembly 400 is configured to perform the functions as discussed above. In another embodiment, at least one of the functions of the processor 410 discussed above may be performed by a processor 610 of the server 3.

The processor 410 in the present disclosure can be implemented by any appliances or by any software or applications run by the appliances. The processor 410 may be connected to a workstation or another external device (e.g., control panel, remote) and/or a database for receiving user inputs, system characteristics, and any of the values described herein. The processor 410 may include a controller. Optionally, the processor 410 may include an input device and/or a sensing circuit in communication with any of the sensors. The sensing circuit receives sensor measurements from the sensors as described above. Optionally, the processor 410 may include a drive unit for receiving and reading non-transitory computer media having instructions. Additional, different, or fewer components may be included. The processor 410 is configured to perform instructions stored in the memory 440 for executing the algorithms described herein.

The processor 410 may be a general purpose or specific purpose processor, an application specific integrated circuit (ASIC), one or more programmable logic processors (PLCs), one or more field programmable gate arrays (FPGAs), a group of processing components, or other suitable processing components. The processor 410 is configured to execute computer code or instructions stored in memory or received from other computer readable media (e.g., embedded flash memory, local hard disk storage, local ROM, network storage, a remote server, etc.). The processor 410 may be a single device or combinations of devices, such as associated with the network 20, distributed processing, or cloud computing.

In an embodiment, the battery 420 of the controlling assembly 400 may be electrically connected to each element of the controlling assembly 400 so as to supply the power. In another embodiment, the battery 420 may be electrically connected to each element of the sensor assembly 300 to supply the power. In another embodiment, the controlling assembly 400 and the sensor assembly 300 may be electrically connected to home power supply.

In an embodiment, the user interface 430 of the controlling assembly 400 is configured to receive operation commands input by the users when the users need help from the maintenance person. In this embodiment, the user interface 430 may comprise a button 431 to generate a refilling request, a cleaning request, and/or a checking request. For example, when the users find that the products in the first module 210, the second module 220, or the third module 230 are used up or that the trash fills up all internal spaces of the fourth module 240, the users may use the button 431 to notify the maintenance person to refill or clean the module assembly 200. For another example, when the users find that at least one sensor of the sensor assembly 300 is not working, the users may use the button 431 to notify the maintenance person to check the sensor assembly 300.

In another embodiment, the user interface 430 may comprise a touch screen comprising at least one touch area configured to allow the users to input the operation commands. For example, the user interface 430 may allow the users to select services to be provide by the maintenance person.

In an embodiment, the memory 440 of the controlling assembly 400 is configured to store the distance data, the weight data, the door data, the level data, the movement data, and/or the light intensity data obtained by the sensor assembly 300 and the operation period data obtained by the timer 460. The memory 440 may also store the operation commands input by the users. The memory 440 may also store the predetermined distance, the predetermined weight, the predetermined time period, the predetermined number, the predetermined level, the predetermined movement value, the predetermined light intensity value, and/or the predetermined operation period. The memory 440 may comprise a database configured to store the above data.

The memory 440 may include random access memory (RAM), read-only memory (ROM), hard drive storage, temporary storage, non-volatile memory, flash memory, optical memory, or any other suitable memory for storing software objects and/or computer instructions. The memory 440 may include database components, object code components, script components, or any other type of information structure for supporting the various activities and information structures described in the present disclosure. The memory 440 may be communicably connected to the processor 410 via a processing circuit and may include computer code for executing (e.g., by the processor 410) one or more processes described herein. For example, the memory 440 may include graphics, web pages, HTML files, XML files, script code, shower configuration files, or other resources for use in generating graphical user interfaces for display and/or for use in interpreting user interface inputs to make command, control, or communication decisions.

In an embodiment, the communication unit 450 of the controlling assembly 400 is configured to receive the data and/or the instructions 411 from the processor 410. The communication unit 450 is further configured to communicate, via the network 20, with the server 3. Thus, the communicate unit 450 may obtain data from and transmit the data and/or the instructions 411 to the server 3.

The communication unit 450 may include any operable connection, ingress ports, and egress ports. An operable connection may be one in which signals, physical communications, and/or logical communications may be sent and/or received. An operable connection may include a physical interface, an electrical interface, and/or a data interface. The communication unit 450 may be connected to the network 20. The network 20 may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network 20 may be a public network, such as the Internet, a private network, such as an intranet, or combinations thereof, and may utilize a variety of networking protocols now available or later developed including, but not limited to TCP/IP based networking protocols.

In an embodiment, the timer 460 of the controlling assembly 400 is configured to count an operation period during which the first module 210, the second module 220, or the third module 230 dispenses the corresponding product and an operation period during which the door 241 of the fourth module 240 is in an open status.

Based on the counted operation period data, it may be determined whether to control the first module 210, the second module 220, or the third module 230 to stop dispensing the corresponding product or control the fourth module 240 to close the door 241.

To this end, the counted operation period may be compared with a respective predetermined operation period. When the processor 410 determines that the first module 210, the second module 220, or the third module 230 has dispensed the corresponding product longer than the respective predetermined operation period, the processor 410 may automatically control the first module 210, the second module 220, or the third module 230 to stop dispensing the corresponding product. When the processor 410 determines that the door 241 of the fourth module 240 is in an open status longer than the predetermined operation period, the processor 410 may automatically control the fourth module 240 to close.

In an embodiment, the motor 470 of the controlling assembly 400 is configured to control the door 241 of the fourth module 240 to open or close. Specifically, the motor 470 is connected to the door 241 of the fourth module 240 through a gear. Thus, when the object sensor 310 detects an object, e.g., a hand of the user or the maintenance person, the processor 410 may send an instruction 411 to the motor 470 to drive the gear so as to open the door 241 of the fourth module 240.

When the processor 410 determines that the door 241 of the fourth module 240 is in an open status for a time period longer than the predetermined time period or the door 241 has been opened for more than the predetermined number, the processor 410 may send an instruction 411 to the motor 470 to drive the gear so as to close the door 241 of the fourth module 240.

In an embodiment, the controlling assembly 400 may further comprise an adapter so that the users may plug in and charge their cellphones when using the bathroom.

2.2 Server End of Bathroom Managing System

In an embodiment, the server 3 comprises the processor 610, a user interface 620 communicably connected to the processor 610, a memory 630 communicably connected to the processor 610, and a communication unit 640 communicably connected to the processor 610. Each element of the server 3 may be connected to a bus 10 to exchange instructions and/or data between or among the elements.

In an embodiment, the processor 610, the user interface 620, the memory 630, and the communication unit 640 may have the same structures as the corresponding elements of the controlling assembly 400.

In an embodiment, the processor 610 of the server 3 is configured to generate the instructions 611 in response to the instructions 411 received from the processor 410.

For example, when the processor 410 of the bathroom modular device 1 determines that the weight of the corresponding product in the first module 210, the second module 220, or the third module 230 is smaller than the respective predetermined weight or determines that the weight of the trash in the fourth module 240 is larger than the respective predetermined weight, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked. When the processor 610 of the server 3 receive the instructions 411 from the processor 410 through the communication unit 640, the processor 610 may generate the corresponding instructions 611 to notify the maintenance person.

For example, when the processor 410 of the bathroom modular device 1 determines that the door 241 of the fourth module 240 is in an open status for a time period longer than the predetermined time period or the door 241 has been opened for more than the predetermined number, the processor 410 may generate the instructions 411 to notify the maintenance person that the trash should be removed from the fourth module 240. In another embodiment, the processor 410 may also generate the instructions 411 to notify the maintenance person that the maintenance person that the fourth module 240 should be checked. When the processor 610 of the server 3 receive the instructions 411 from the processor 410 through the communication unit 640, the processor 610 may generate the corresponding instructions 611 to notify the maintenance person.

For example, when the processor 410 of the bathroom modular device 1 determines the level of the cleaning product in the first module 210 is lower than the predetermined level, the processor 410 may generate the instructions 411 to notify the maintenance person that the first module 210 should be refilled with the cleaning product. In another embodiment, the processor 410 may also generate the instructions 411 to notify the maintenance person that the first module 210 should be checked. When the processor 610 of the server 3 receive the instructions 411 from the processor 410 through the communication unit 640, the processor 610 may generate the corresponding instructions 611 to notify the maintenance person.

For example, when the processor 410 of the bathroom modular device 1 determines the summed movement value of the corresponding product in the first module 210, the second module 220, or the third module 230 or the summed movement value of the trash in the fourth module 240 is larger than the respective predetermined movement value, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked. When the processor 610 of the server 3 receive the instructions 411 from the processor 410 through the communication unit 640, the processor 610 may generate the corresponding instructions 611 to notify the maintenance person.

For example, when the processor 410 of the bathroom modular device 1 determines the light intensity value of the corresponding product in the first module 210, the second module 220, or the third module 230 is larger than the respective predetermined light intensity value, the processor 410 may generate the instructions 411 to notify the maintenance person that the first module 210, the second module 220, or the third module 230 should be refilled with the corresponding product. When the processor 410 of the bathroom modular device 1 determines the light intensity value of in the fourth module 240 is smaller than the predetermined light intensity value, the processor 410 may generate the instructions 411 to notify the maintenance person that the trash should be removed from the fourth module 240. In another embodiment, the processor 410 may generate the instructions 411 to notify the maintenance person that the first module 210, the second module 220, third module 230, and the fourth module 240 should be checked. When the processor 610 of the server 3 receive the instructions 411 from the processor 410 through the communication unit 640, the processor 610 may generate the corresponding instructions 611 to notify the maintenance person.

In another embodiment, the processor 610 may perform the same or similar functions of the processor 410.

In an embodiment, the user interface 620 of the server 3 is configured to display notifications corresponding to the instructions 611. For example, the user interface 620 may display the notifications to the maintenance person that the first module 210, the second module 220, or the third module 230 should be refilled with the corresponding product. For example, the user interface 620 may display the notification to the maintenance person that the trash should be removed from the fourth module 240. For example, the user interface 620 may display the notification to the maintenance person that the first module 210, the second module 220, the third module 230, and/or the fourth module 240 should be checked.

In another embodiments, the user interface 620 may display any data, operation commands, and/or predetermined values received by the processor 610.

The user interface 620 may be a separate device, e.g., computer, cell phone, iPad etc., communicably connected to the server 3 or may be integrated into the server 3 and thus become a part of the server 3.

In another embodiment, the user interface 620 may comprise a touch screen comprising at least one touch area configured to allow the maintenance person to input the operation commands.

In an embodiment, the memory 630 of the server 3 is configured to store the instructions 411 generated by the processor 410 of the bathroom modular device 1 and/or the instructions 611 generated by the processor 610 of the server 3.

In another embodiment, the memory 630 may store the same or similar data, operation commands, and/or predetermined values stored in the memory 440.

In an embodiment, the communication unit 640 of the server 3 is configured to communicate, via the network 20, with the bathroom modular device 1. Thus, the communicate unit 640 may obtain the data and/or the instructions 411 from the processor 410.

3. Bathroom Managing Method

Figure 10:
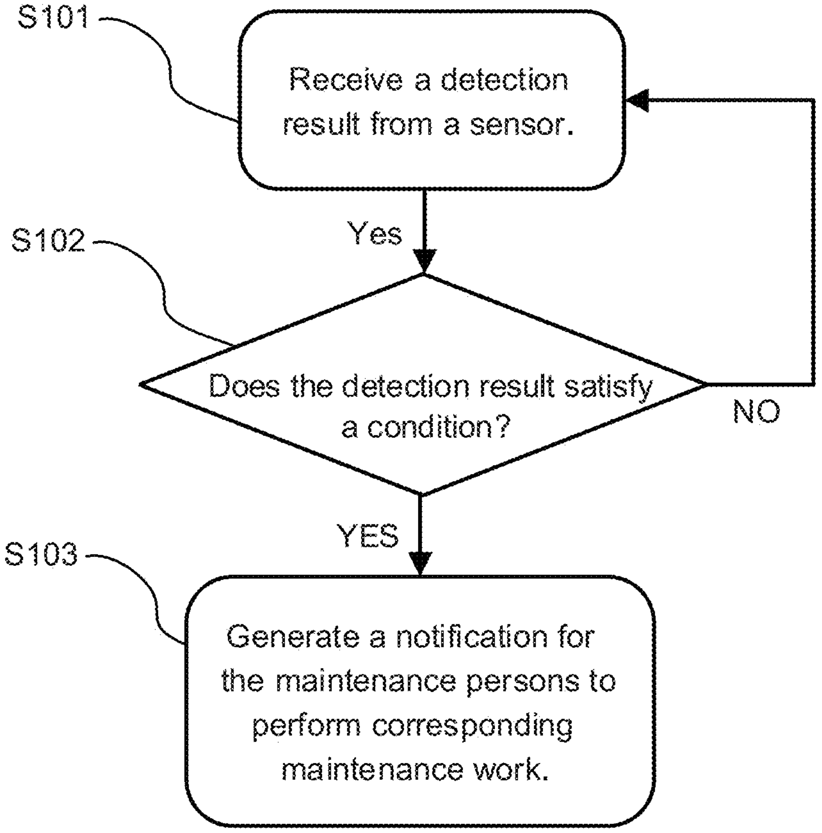
FIG. 10 is a block diagram illustrating a bathroom managing method according to the present disclosure.

FIG. 10 is a block diagram illustrating a bathroom managing method according to the present disclosure.

In an embodiment, the bathroom managing method 4 is performed by the bathroom modular device 1 as discussed above. In another embodiment, the bathroom managing method may also be performed by the server 3 as described above.

In an embodiment, at act S101, the processor 410 of the bathroom modular device 1 may receive a detection result obtained by a sensor of the sensor assembly 300.

As discussed above, the object sensor 310 may detect a distance between an object and the object sensor 310. The weight sensor 320 may measure a weight of the corresponding product in the first module 210, the second module 220, or the third module 230 and/or measure a weight of the trash in the fourth module 240. Based on the weight data obtained by the weight sensor 320. The door sensor 330 may detect whether the door 241 of the fourth module 240 is opened and how many times the door 241 has been opened. The level sensor 340 may detect a level of the cleaning product in the first module 210. The movement sensor 350 may detect a movement of the corresponding product in the first module 210, the second module 220, or the third module 230 and/or detect a movement of the trash in the fourth module 240. The light sensor 360 may detect a light intensity in the first module 210, the second module 220, the third module 230, or the fourth module 240.

At act S102, the processor 410 of the bathroom modular device 1 may determine whether the received detection result satisfies at least one condition defined by a predetermined value.

As discussed above, the predetermined value may include the predetermined distance, the predetermined weight, the predetermined time period, the predetermined number, the predetermined level, the predetermined movement value, the predetermined light intensity value, and/or the predetermined operation period.

At act S103, when the at least one condition is satisfied (YES in act S102), the processor 410 of the bathroom modular device 1 may generate a notification for the maintenance person to perform the corresponding maintenance work.

As discussed above, when the processor 410 determines that the distance between the detected object and an object sensor 310 is smaller than the respective predetermined distance, the processor 410 may control the corresponding module among the first module 210, the second module 220, and the third module 230 to dispense the corresponding product or control the fourth module 240 to open the door 241.

As discussed above, when the processor 410 determines that the weight of the corresponding product in the first module 210, the second module 220, or the third module 230 is smaller than the respective predetermined weight or determines that the weight of the trash in the fourth module 240 is larger than the respective predetermined weight, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

As discussed above, when the processor 410 determines that the door 241 of the fourth module 240 is in an open status for a time period longer than the predetermined time period or the door 241 has been opened for more than the predetermined number, the processor 410 may generate the instructions 411 to notify the maintenance person that the trash should be removed from the fourth module 240. In another embodiment, the processor 410 may generate the instructions 411 to notify the maintenance person that the fourth module 240 should be checked.

As discussed above, when the processor 410 determines the level of the cleaning product in the first module 210 is lower than the predetermined level, the processor 410 may prevent the first module 210 from dispensing the cleaning product. In this case, the processor 410 may generate the instructions 411 to notify the maintenance person that the first module 210 should be refilled with the cleaning product. In another embodiment, the processor 410 may generate the instructions 411 to notify the maintenance person that the first module 210 should be checked.

As discussed above, when the processor 410 determines that the summed movement value of the corresponding product in the first module 210, the second module 220, or the third module 230 or the summed movement value of the trash in the fourth module 240 is larger than the respective predetermined movement value, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

As discussed above, when the processor 410 determines that the light intensity value in the first module 210, the second module 220, or the third module 230 is larger than the respective predetermined light intensity value or the light intensity value in the fourth module 240 is smaller than the respective predetermined light intensity value, the processor 410 may prevent the corresponding module among the first module 210, the second module 220, and the third module 230 from dispensing the corresponding product or prevent the fourth module 240 from opening the door 241. In this case, the processor 410 may generate the instructions 411 to notify the maintenance person that the first module 210, the second module 220, or the third module 230 should be refilled with the corresponding product or notify the maintenance person that the trash should be removed from the fourth module 240. In another embodiment, the processor 410 may generate the instructions 411 to notify the maintenance person that the first module 210, the second module 220, third module 230, and the fourth module 240 should be checked.

When the at least one condition is not satisfied (NO in act S102), the bathroom managing method 4 returns to act S101.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, should be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bathroom modular device, comprising:
- a base configured to be connected to a bathroom fixture and comprising a lower surface;
- a module assembly comprising a plurality of modules, at least one module of the plurality of modules configured to be removably connected to the lower surface of the base and configured to house at least one consumable product;
- a processor configured to control the module assembly; and
- a sensor assembly communicably connected to the processor,
- wherein the plurality of modules comprise at least one trash bin,
- wherein the sensor assembly comprises a door sensor configured to detect whether a door of the at least one trash bin is opened, the door sensor disposed on the at least one trash bin, and wherein a processor is further configured, in response to a detection result obtained by the door sensor, to generate a notification that the trash should be removed from the at least one trash bin.

2. The bathroom modular device according to claim 1,
- wherein each module of the module assembly comprises at least one rail configured to be engaged with the base and configured to allow the respective module to move along a length axis of the base.

3. The bathroom modular device according to claim 2,
- wherein the base comprises at least one recess configured to receive the at least one rail of each module of the module assembly.

4. The bathroom modular device according to claim 1, further comprising:
- a lid configured to be connected to an upper surface of the base.

5. The bathroom modular device according to claim 1,
- wherein the plurality of modules comprise at least one cleaning product module and at least one trash bin,
- wherein the sensor assembly comprises a plurality of object sensors configured to detect an object within a detection range, each object sensor disposed on a respective module of the module assembly, and
- wherein the processor is further configured, in response to a detection result obtained by a respective object sensor, to control the at least one cleaning product module to dispense the at least one consumable product and control the at least one trash bin to open.

6. The bathroom modular device according to claim 5,
- wherein the at least one cleaning product module is configured to dispense the at least one consumable product from a first opening disposed on a first surface of the at least one cleaning product module and from a second opening disposed on a second surface of the at least one cleaning product module,
- wherein the at least one trash bin is configured to be opened from a first surface of the at least one trash bin and a second surface of the at least one trash bin,
- wherein the plurality of object sensors comprise a first object sensor disposed on the first surface of the at least one cleaning product module, a second object sensor disposed on the second surface of the at least one cleaning product module, a third object sensor disposed on a first surface of the at least one trash bin, and a fourth object sensor disposed on the second surface of the at least one trash bin,
- wherein the processor is further configured to determine whether to control the at least one cleaning product module to dispense the at least one consumable product from the first opening or the second opening by determining whether the first object sensor or the second object sensor is activated, and
- wherein the processor is further configured to determine whether to open the at least one trash bin from the first surface of the at least one trash bin or the second surface of at least one trash bin by determining whether the third object sensor or the fourth object sensor is activated.

7. The bathroom modular device according to claim 1,
- wherein the plurality of modules comprise at least one cleaning product module and at least one trash bin,
- wherein the sensor assembly comprises a plurality of weight sensors respectively configured to measure a weight of the consumable product and a weight of trash in the at least one trash bin, each weight sensor disposed on a respective module of the module assembly, and
- wherein the processor is further configured, in response to a detection result obtained by the respective weight sensor, to generate a notification that the at least one cleaning product module should be refilled and a notification that the trash should be removed from the at least one trash bin.

8. The bathroom modular device according to claim 1, further comprising:
- a timer configured to count an open period of the door of the at least one trash bin,
- wherein the processor is further configured, in response to a counting result of the timer, to generate the notification that the trash should be removed from the at least one trash bin.

9. The bathroom modular device according to claim 1,
- wherein the plurality of modules comprise at least one cleaning product module,
- wherein the sensor assembly comprises a level sensor configured to detect a level of the consumable product, the level sensor disposed on the at least one cleaning product module, and
- wherein the processor is further configured, in response to a detection result obtained by the level sensor, to generate a notification that the at least one cleaning product module should be refilled.

10. The bathroom modular device according to claim 1,
- wherein the plurality of modules comprise at least one cleaning product module and at least one trash bin,
- wherein the sensor assembly comprises a plurality of movement sensors respectively configured to detect a movement of the consumable product and a movement of trash in the at least one trash bin, each movement sensor disposed on a respective module of the module assembly, and wherein the processor is further configured, in response to a detection result obtained by the respective movement sensor, to generate a notification that the at least one cleaning product module should be refilled and a notification that the trash should be removed from the at least one trash bin.

11. The bathroom modular device according to claim 1, further comprising:

a plurality of light emitters, each disposed in a respective module of the module assembly, wherein the plurality of modules comprise at least one cleaning product module and at least one trash bin, wherein the sensor assembly comprises a plurality of light sensors, each configured to detect a light intensity in the respective module of the module assembly and disposed on the respective module of the module assembly, and wherein the processor is further configured, in response to a detection result obtained by the respective light sensor, to generate a notification that the at least one cleaning product module should be refilled and a notification that the trash should be removed from the at least one trash bin.

12. The bathroom modular device according to claim 1, wherein the module assembly comprise a plurality of cleaning product modules configured to house and dispense a plurality of consumable products, wherein the at least one consumable product comprises hand sanitizers, toilet paper, and pads, wherein the plurality of cleaning product modules comprises a first cleaning product module configured to house and dispense the hand sanitizers, a second cleaning product module configured to house and dispense the toilet paper, and a third cleaning product module configured to house and dispense the pads, wherein the second cleaning product module comprises a lever, comprising:

a first end pivotably connected to an inner surface of the second cleaning product module; and a second end attached to an outer surface of the toilet paper in the second cleaning product module, and wherein an angle of the lever with respect to the inner surface of the second cleaning product module varies based on a change in an amount of the toilet paper in the second cleaning product module.

13. A bathroom managing system, comprising:

a bathroom modular device, comprising:

a base configured to be connected to a bathroom fixture and comprising a lower surface; and a module assembly comprising a plurality of modules, at least one module of the plurality of modules configured to be removably connected to the lower surface of the base and configured to house at least one consumable product; and a server communicably connected to the bathroom modular device and configured to receive a notification transmitted by the bathroom modular device;

wherein the notification comprises an alert for a maintenance person to refill the module assembly with the at least one consumable product and an alert for the maintenance person to remove trash from the module assembly, wherein the bathroom modular device transmits the alert to the server in response to a determination that an angle of a lever with respect to an inner surface of the at least one module is smaller than a predetermined degree, wherein the lever comprises:

a first end pivotably connected to the inner surface of the at least one module; and a second end attached to an outer surface of the at least one consumable product in the at least one module.

14. A bathroom managing method, comprising:

receiving, by a processor of a bathroom modular device, a detection result obtained by a sensor of the bathroom modular device, the bathroom modular device configured to be installed in a bathroom fixture;

determining, by the processor of the bathroom modular device, whether the received detection result satisfies at least one condition defined by a predetermined value; and generating, by the processor of the bathroom modular device, a notification for a maintenance person to perform corresponding maintenance work when the processor of the bathroom modular device determines that the received detection result satisfies the at least one condition defined by the predetermined value;

wherein the bathroom modular device comprises at least one trash bin configured to house trash, and wherein when the processor of the bathroom modular device determines that the at least one trash bin is in an open status longer than a predetermined time period or determines that the at least one trash bin has been opened for more than a predetermined number, the processor of the bathroom modular device generates a notification indicating that the trash should be removed from the at least one trash bin.

15. The bathroom managing method according to claim 14, wherein the bathroom modular device comprises at least one cleaning product module configured to house and dispense at least one consumable product and at least one trash bin configured to house trash, wherein when the processor of the bathroom modular device determines that a weight of the at least one consumable product in the at least one cleaning product module is smaller than a first predetermined weight, the processor of the bathroom modular device generates a notification indicating that the at least one cleaning product module should be refilled with the at least one consumable product, and wherein when the processor of the bathroom modular device determines that a weight of the trash in the at least one trash bin is larger than a second predetermined weight, the processor of the bathroom modular device generates a notification indicating that the trash should be removed from the at least one trash bin.

16. The bathroom managing method according to claim 14, wherein the bathroom modular device comprises at least one cleaning product module configured to house and dispense at least one consumable product, and wherein when the processor of the bathroom modular device determines that a level of the at least one consumable product in the at least one cleaning product module is smaller than a predetermined level, the processor of the bathroom modular device generates a notification indicating that the at least one cleaning product module should be refilled with the at least one consumable product.

* * * * *